(12) United States Patent
Natu et al.

(10) Patent No.: US 11,954,047 B2
(45) Date of Patent: Apr. 9, 2024

(54) CIRCUITRY AND METHODS FOR SPATIALLY UNIQUE AND LOCATION INDEPENDENT PERSISTENT MEMORY ENCRYPTION

(71) Applicant: Intel Corporation, Santa Clara, CA (US)

(72) Inventors: Mahesh Natu, Folsom, CA (US); Anand K. Enamandram, Folsom, CA (US); Manjula Peddireddy, Santa Clara, CA (US); Robert A. Branch, Portland, OR (US); Tiffany J. Kasanicky, Longmont, CO (US); Siddhartha Chhabra, Portland, OR (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 17/033,745

(22) Filed: Sep. 26, 2020

(65) Prior Publication Data
US 2022/0100679 A1 Mar. 31, 2022

(51) Int. Cl.
*G06F 12/14* (2006.01)
*G06F 9/30* (2018.01)
*G06F 12/02* (2006.01)

(52) U.S. Cl.
CPC ...... *G06F 12/1441* (2013.01); *G06F 9/30101* (2013.01); *G06F 9/30145* (2013.01); *G06F 12/0238* (2013.01); *G06F 12/1408* (2013.01)

(58) Field of Classification Search
CPC ............ G06F 12/1441; G06F 9/30101; G06F 9/30145; G06F 12/0238; G06F 12/1408; H04L 9/0866
See application file for complete search history.

(56) References Cited

U.S. PATENT DOCUMENTS

| 9,984,238 B1 * | 5/2018 | Roth ...................... H04L 67/568 |
| 10,230,824 B2 | 3/2019 | Bergeron |

(Continued)

OTHER PUBLICATIONS

Notice of Grant, NL App. No. 2029042, dated Sep. 16, 2022, 5 pages of Original Document Only.

(Continued)

*Primary Examiner* — Zhuo H Li
(74) *Attorney, Agent, or Firm* — NICHOLSON DE VOS WEBSTER & ELLIOTT LLP

(57) ABSTRACT

Systems, methods, and apparatuses to implement spatially unique and location independent persistent memory encryption are described. In one embodiment, a system on a chip (SoC) includes at least one persistent range register to indicate a persistent range of memory, an address modifying circuit to check if an address for a memory store request is within the persistent range indicated by the at least one persistent range register, and append a unique identifier value, for a component corresponding to the memory store request for the address, to the address to generate a modified address and output the modified address as an output address when the address is within the persistent range, and output the address as the output address when the address is not within the persistent range, and an encryption engine circuit to generate a ciphertext based on the output address.

24 Claims, 18 Drawing Sheets

(56) References Cited

U.S. PATENT DOCUMENTS

| | | |
|---|---|---|
| 2015/0134962 A1* | 5/2015 | Mahajan ............... H04L 63/061 |
| | | 713/171 |
| 2015/0169472 A1 | 6/2015 | Wolrich et al. |
| 2016/0364583 A1 | 12/2016 | Benoit et al. |
| 2019/0087575 A1* | 3/2019 | Sahita .................... G06F 21/79 |
| 2019/0243637 A1 | 8/2019 | Nachimuthu et al. |
| 2020/0057664 A1 | 2/2020 | Durham et al. |
| 2020/0068390 A1 | 2/2020 | Knapp et al. |

OTHER PUBLICATIONS

Intel, "Intel (Registered) Architecture Memory Encryption Technologies Specification", Ref: #336907-002US, Rev: 1.2, Apr. 2019, 30 pages.

Search Report and Written Opinion, NL App. No. 2029042, dated Mar. 18, 2022, 7 pages of Original Document Only.

* cited by examiner

PERSISTENT CONTROL REGISTERS 400

| Register | CR | Size | Description |
|---|---|---|---|
| Persistent1_BASE 402 | MMIO | 32 | Offset to be subtracted from persistent1 system address |
| Persistent1_LIMIT 404 | MMIO | 32 | Persistent1 range limit in system addresses |
| Persistent2_BASE 406 | MMIO | 32 | Offset to be subtracted from persistent2 system address |
| Persistent2_LIMIT 408 | MMIO | 32 | Persistent2 range limit in system addresses |
| Persistent_ADDR_IDS 410 | MMIO | 32 | IDs to be appended to Persistent1/2 tweak input address |

PERSISTENT1_BASE EXAMPLE FORMAT 402

| Bit | Field | Access | Description |
|---|---|---|---|
| 21:0 | Base | RWL | Base physical address [51:30] (e.g., 1G aligned) to be subtracted for persistent1 addresses to generate tweak |
| 31:22 | RSVD | RO | E.g., must be zero |

PERSISTENT1_LIMIT EXAMPLE FORMAT 404

| Bit | Field | Access | Description |
|---|---|---|---|
| 21:0 | Limit | RWL | Physical address [51:30] (e.g., 1G aligned), specify upper limit of persistent1 address range |
| 31:22 | RSVD | RO | E.g., must be zero |

PERSISTENT2_BASE EXAMPLE FORMAT 406

| Bit | Field | Access | Description |
|---|---|---|---|
| 21:0 | Base | RWL | Base physical address [51:30] (e.g., 1G aligned) to be subtracted for persistent1 addresses to generate tweak |
| 31:22 | RSVD | RO | E.g., must be zero |

PERSISTENT2_LIMIT EXAMPLE FORMAT 408

| Bit | Field | Access | Description |
|---|---|---|---|
| 21:0 | Limit | RWL | Physical address [51:30] (e.g., 1G aligned), specify upper limit of persistent1 address range |
| 31:22 | RSVD | RO | E.g., must be zero |

PERSISTENT_ADDR_IDS EXAMPLE FORMAT 410

| Bit | Field | Access | Description |
|---|---|---|---|
| 1:0 | Persistent1_ID | RWL | ID used to indicate persistent1 access |
| 3:2 | Persistent2_ID | RWL | ID used to indicate persistent2 access |
| 15:4 | APPEND_ID | RWL | 12 bit IDs to append to persistent1 and persistent2 tweak input address. E.g., this ID should be unique for each socket and may be formed from SocketID, MC_ID, and channel_ID |
| 31:16 | Reserved | RWL | E.g., must be zero |

FIG. 4

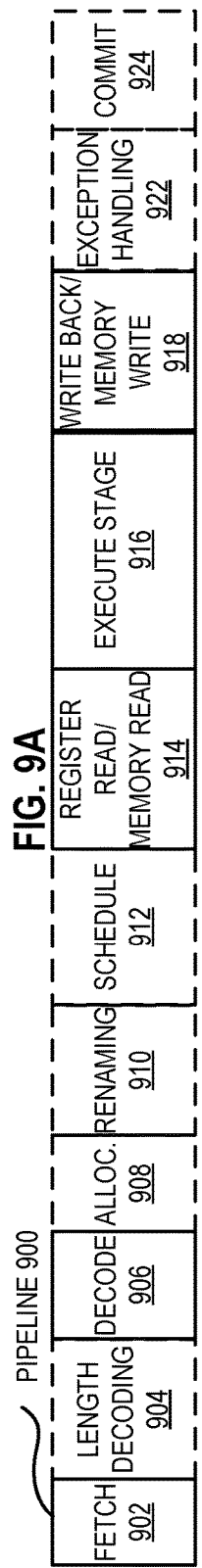
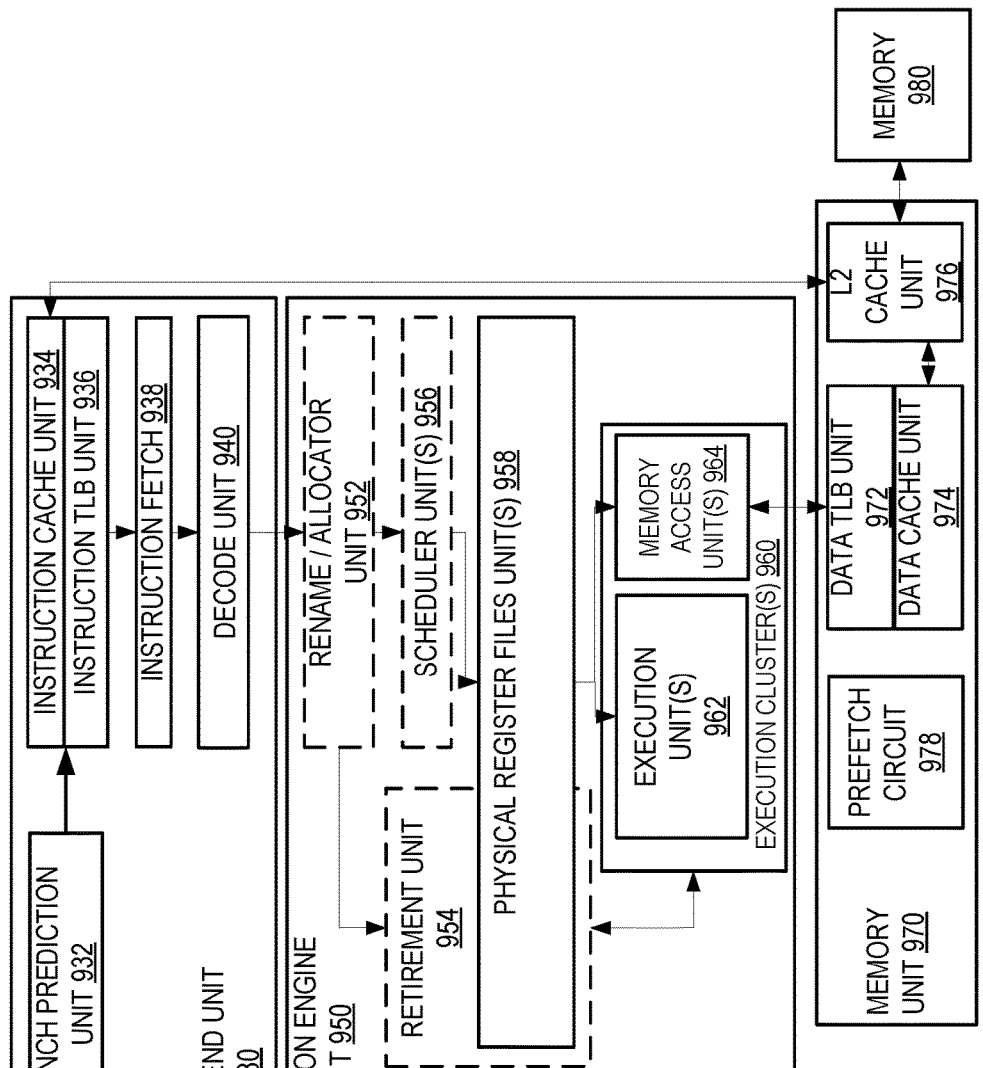
FIG. 9A
FIG. 9B

CIRCUITRY AND METHODS FOR SPATIALLY UNIQUE AND LOCATION INDEPENDENT PERSISTENT MEMORY ENCRYPTION

TECHNICAL FIELD

The disclosure relates generally to electronics, and, more specifically, an embodiment of the disclosure relates to circuitry to implement spatially unique and location independent persistent memory encryption.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 4 illustrates persistent control registers and their example formats according to embodiments of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
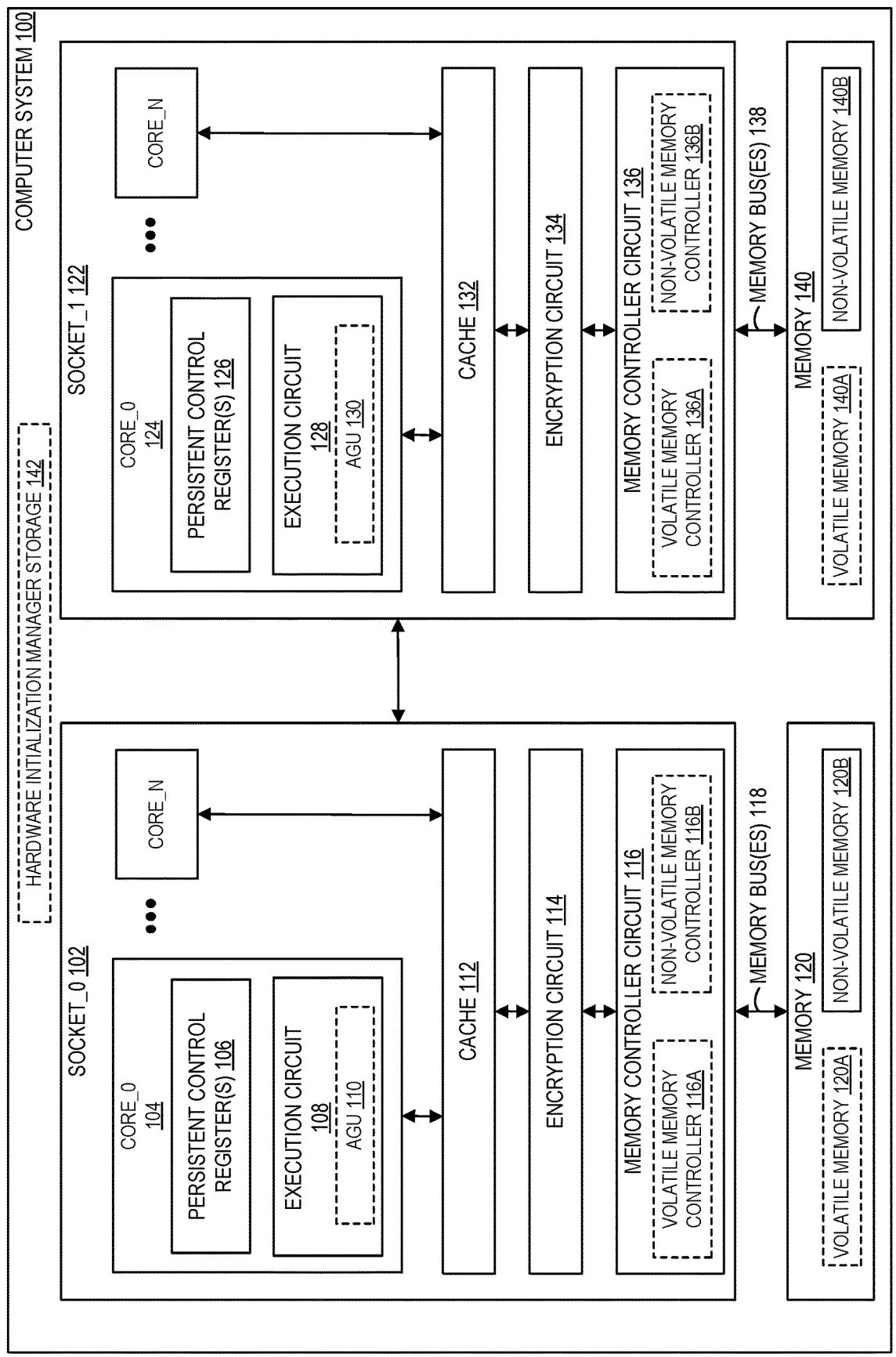
FIG. 1 illustrates a block diagram of a computer system including a plurality of sockets having an encryption circuit according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory DRAM) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), e.g., accessible according to a Peripheral Component Interconnect Express (PCI-e) standard.

Certain systems (e.g., processors) utilize encryption of data to provide security. For example, a processor (e.g., as an instruction set architecture (ISA) extension) may support a total memory encryption (TME) (for example, memory encryption with a single ephemeral key) and/or multiple-key TME (MKTME) (for example, memory encryption that supports the use of multiple keys for page granular memory encryption, e.g., with additional support for software provisioned keys. Certain embodiments herein utilize multiple types of memory, for example, a volatile memory (e.g., DRAM) and a non-volatile memory (e.g., NVRAM).

In certain embodiments, TME provides the capability to encrypt the entirety of the physical memory of a system. For example, with this capability enabled in the very early stages of the boot process with a small change to hardware initialization manager code (e.g., Basic Input/Output System (BIOS) firmware). In certain embodiments, once TME is configured and locked in, it will encrypt all the data on external memory buses of a SoC using an encryption standard/algorithm (e.g., an Advanced Encryption Standard (AES), such as, but not limited to, one using 128-bit keys). In certain embodiments, the encryption (e.g., data) key used for TME uses a hardware random number generator implemented in the SoC (e.g., processor), and the key(s) are not accessible by software or by using external interfaces to the SoC. In certain embodiments, TME capability is intended to provide protections of encryption to external memory buses and/or DIMMs.

In certain embodiments, multi-key TME (MKTME) builds on TME and adds support for multiple encryption keys. In certain embodiments, the SoC implementation supports a fixed number of encryption keys, and software can configure an SoC to use a subset of available keys. In certain embodiments, software manages the use of keys and can use each of the available keys for encrypting any section (e.g., page) of the memory. Thus, certain embodiments of MKTME allow page granular encryption of memory. In one embodiment (e.g., by default), MKTME uses the TME encryption key unless explicitly specified by software. In addition to supporting a processor (e.g., central processing unit (CPU) generated ephemeral key (e.g., not accessible by software or by using external interfaces to an SoC), embodiments of MKTME also support software provided keys. In certain embodiments, software provided keys are particularly useful when used with non-volatile memory or when combined with attestation mechanisms and/or used with key provisioning services. In certain embodiments, a tweak key used for MKTME is supplied by software.

In a virtualization scenario, certain embodiments herein allow a virtual machine monitor (VMM) or hypervisor to manage the use of keys to transparently support legacy operating systems without any changes (e.g., such that MKTME can also be viewed as TME virtualization in such a deployment scenario). In certain embodiments, an operating system (OS) is enabled to take additional advantage of MKTME capability, both in native and virtualized environments. In certain embodiments, MKTME is available to each guest OS in a virtualized environment, and the guest OS can take advantage of MKTME in the same ways as a native OS.

Certain embodiments (e.g., platforms) herein use TME and/or MKTME to prevent an attacker with physical access to the machine from reading memory (e.g. and stealing any confidential information therein). In certain embodiments, a system (e.g., using TME) encrypts the entire memory with a single-key generated by hardware (e.g., microcode) at boot time under hardware initialization manager code (e.g., BIOS firmware) control. Certain embodiments (e.g., platforms) herein include non-volatile memory (e.g., non-volatile DIMMs) to provide persistent memory that can replace traditional hard disk drives among other usages such as memory expansion. In certain embodiments, the use of such non-volatile memory (e.g., non-volatile DIMMs) as storage is a distinct performance benefit over traditional storage. In certain embodiments, non-volatile memory (e.g., non-volatile DIMMs) can be accessed using direct access mode (DAX) through regular loads and stores similar to volatile system memory (e.g., Double Data Rate Synchronous Dynamic Random-Access Memory (DDR SDRAM)) but unlike storage which requires software involvement to do DMA from storage (e.g., HDD) to memory for access.

Certain embodiments utilize encryption for storage to prevent data loss, e.g., on lost/stolen systems. For example, certain embodiments utilize encryption for non-volatile memory (e.g., non-volatile DIMMs) (e.g., with certain OS platforms offering a full volume encryption (e.g., according to a BitLocker standard) for storage encryption). In certain embodiments, multi-key TME provides hardware primitives to encrypt data for both volatile and non-volatile memory. In one embodiment, an AES-XTS standard is used as the encryption algorithm to provide the desired security.

In order to ensure spatial uniqueness across the memory space, certain encryption (and decryption) processes utilize a system physical address to tweak the encryption, e.g., to ensure that same plaintext when encrypted and stored at different physical locations in memory gets a different ciphertext (e.g., to inhibit frequency analysis from an attacker with physical access to the machine which can result in leaking plaintext). While using a physical address as a tweak works for volatile memory, when used with non-volatile memory, it makes certain systems brittle and prone to data loss on configuration changes. One example configuration change is if a user adds volatile (e.g., DDR) memory to a machine, the memory map changes, and thus changes the location of persistent memory as well. This results in data loss as on boot up after memory add, as the persistent memory accesses thereafter use a different physical address than what was used to store data before the addition of the volatile memory. Hence, the security requirement of memory encryption to ensure spatial uniqueness is directly at odds with persistence requirements.

Certain embodiments herein provide for spatially unique location independent persistent memory encryption which ensures system (e.g., physical) address independent encryption of data on persistent memory while ensuring spatial uniqueness, thereby meeting both the security and persistence requirements. In one embodiment, location independent encryption proposes a novel tweak construction and introduces a unique identifier value (e.g., per persistent memory device) to be used as part of the encryption to allow multiple persistent memory devices on a single machine. Additionally, device data migration (e.g., moving data from one machine to another) for devices including persistent memory are achievable, e.g., while still ensuring security of the data. Embodiments herein allow for support of secure direct access mode for persistent memories with MKTME. Embodiments herein allow for support of direct access (DAX) mode with MKTME while preventing data loss of encrypted data (e.g., ciphertext) stored in non-volatile memory.

Embodiments herein utilize spatially unique location independent persistent memory encryption where the encryption (e.g., tweak thereof) is generated to meet both the security requirements for data protection and functional requirement for preventing data loss. In certain embodiments, location independent memory encryption uses an offset into a persistent memory range for encryption (e.g., tweak generating), for example, using an offset to make the encryption position independent from the point of view of memory re-configuration. In certain embodiments, on adding and/or removing memory or re-configuring memory ranges, the persistent memory range base can change without resulting in data loss as the offset into the range remains the same. In order to ensure that the tweak is unique across multiple persistent memory devices attached on different memory channels, a unique identifier value is utilized, e.g., a unique ID per channel is used in the unique identifier value. In certain embodiments, the unique identifier value is appended to an input to the encryption (e.g., the tweak operation) to ensure that the encryption (e.g., tweak) stays unique across multiple persistent memory devices on different memory channels, for example, appending the unique identifier value to the offset into the persistent memory range and using the resulting value as the input "address" for the tweak (e.g., a tweak that has as one of its inputs a storage address for the data being encrypted). Such tweak construction also allows for device migration (e.g., shell swap in client systems) in certain embodiments.

Certain embodiments herein (e.g., using location independent persistent memory encryption) provide both security and functional requirements for persistent memory encryption. From a security standpoint, certain embodiments herein achieve spatial uniqueness as each location in a device (e.g., system) gets a unique tweak value (e.g., based in part on the unique identifier value) and/or for locations across multiple devices (e.g., non-volatile memories) on the same platform. From a functionality perspective, embodiments herein allow for (e.g., any scenario resulting in) movement of the persistent memory range without destroying the data (e.g., without destroying accessibility of the data) on the persistent memory device. Additionally, scenarios where persistent memory device is moved from one machine to the other can also be supported.

In certain embodiments, hardware initialization manager code (e.g., BIOS firmware) is to program a unique identifier (e.g., used as the unique identifier value) to host processor (e.g., CPU) register in order to be used. Certain embodiments herein do not change the number of address bits (e.g., 52 bits of address in one embodiment, e.g., by appending a 12-bit wide unique identifier value to the 52 bits of address (e.g., offset)).

Turning now to FIG. 1, an example system architecture is depicted. FIG. 1 illustrates a block diagram of a computer system 100 including a plurality of sockets 102, 122 having an encryption circuit 114, 134 according to embodiments of the disclosure. Although two sockets are shown, a single socket or any plurality of sockets may be utilized. In FIG. 1, socket_0 102 includes a core_0 104 and socket_1 122 includes a core_0 124. A core may be any hardware processor core, e.g., as an instance of core 1190 in FIG. 11B. Although multiple cores are shown, each socket may have a single or any plurality of cores (e.g., where N is any positive integer greater than 1). Each socket may have an identification value, e.g., "socket ID".

Computer system 100 includes persistent control register(s). Persistent control register(s) may be internal to a core or external to a core, e.g., within circuitry referred to as an uncore. In one embodiment, persistent control register(s) (e.g., of a socket) are within a memory controller circuit (e.g., of that socket). In one embodiment, each of persistent control register(s) 106 of socket 102 includes a same data as corresponding persistent control register(s) 126 of socket 122. In one embodiment, a single set of persistent control register(s) is utilized for computer system 100. Example persistent control registers is discussed below in reference to FIG. 4. Persistent control registers may include one or more persistent range registers, e.g., that store value(s) (e.g., provided by execution of hardware initialization manager storage 142) that indicate a range of (e.g., physical) addresses that are to be persisted, e.g., stored in non-volatile memory 120B and/or 140B. Memory access (e.g., store or load) request may be generated by a core, e.g., a memory access request may be generated by execution circuit 108 of core 104 (e.g., caused by the execution of an instruction) and/or a memory access request may be generated by execution circuit 128 of core 124 (e.g., caused by the execution of an instruction). In certain embodiments, a memory access request is serviced by a cache, e.g., cache 112 for socket 102 and/or cache 132 for socket 122. Additionally or alternatively (e.g., for a cache miss), memory access request may be serviced by memory separate from a cache, e.g., but not a disk drive.

In certain embodiments, computer system 100 includes an encryption circuit (e.g., that utilizes location independent persistent memory encryption as disclosed herein). In one embodiment, a single encryption circuit is utilized for both sockets 102, 122 of computer system 100. Encryption circuit 114 of socket 102 may receive a memory access (e.g., store) request from one or more of its cores (e.g., from address generation unit 110 of execution circuit 108) and/or encryption circuit 134 of socket 122 may receive a memory access (e.g., store) request from one or more of its cores (e.g., from address generation unit 130 of execution circuit 128). Encryption circuit may, e.g., for an input of a destination address and text to be encrypted (e.g., plaintext) (e.g., and a key), perform an encryption to generate a ciphertext (e.g., encrypted data). The ciphertext may then be stored in storage, e.g., in memory 120 and/or memory 140. An encryption circuit may perform a decryption operation, e.g., for a memory load request.

In certain embodiments, computer system 100 includes a memory controller circuit. In one embodiment, a single memory controller circuit is utilized for a plurality of sockets of computer system 100. Memory controller circuit 116 of socket 102 may receive an address for a memory access request, e.g., and for a store request also receiving the payload data (e.g., ciphertext) to be stored at the address, and then perform the corresponding access into memory 120, e.g., via one or more memory buses 118. Memory controller circuit 136 of socket 122 may receive an address for a memory access request, e.g., and for a store request also receiving the payload data (e.g., ciphertext) to be stored at the address, and then perform the corresponding access into memory 140, e.g., via one or more memory buses 138. Each memory controller (MC) may have an identification value, e.g., "MC ID". Memory and/or memory bus(es) (e.g., a memory channel thereof) may have an identification value, e.g., "channel ID". Each memory device (e.g., non-volatile memory 120B device and non-volatile memory 140B device) may have its own channel ID. Each socket (e.g., of a single SoC) may have an identification value, e.g., "socket ID". In certain embodiments, memory controller 116 includes a memory controller 116A for volatile memory 120A (e.g., DRAM) and a memory controller 116B for non-volatile memory 120B (e.g., non-volatile DIMM or non-volatile DRAM). In certain embodiments, memory controller 136 includes a memory controller 136A for volatile memory 140A (e.g., DRAM) and a memory controller 136B for non-volatile memory 140B (e.g., non-volatile DIMM or non-volatile DRAM). Computer system 100 may also include a coupling to secondary (e.g., external) memory (e.g., not directly accessible by a processor), for example, a disk (or solid state) drive (e.g., storage unit 1528 in FIG. 15).

Figure 2:
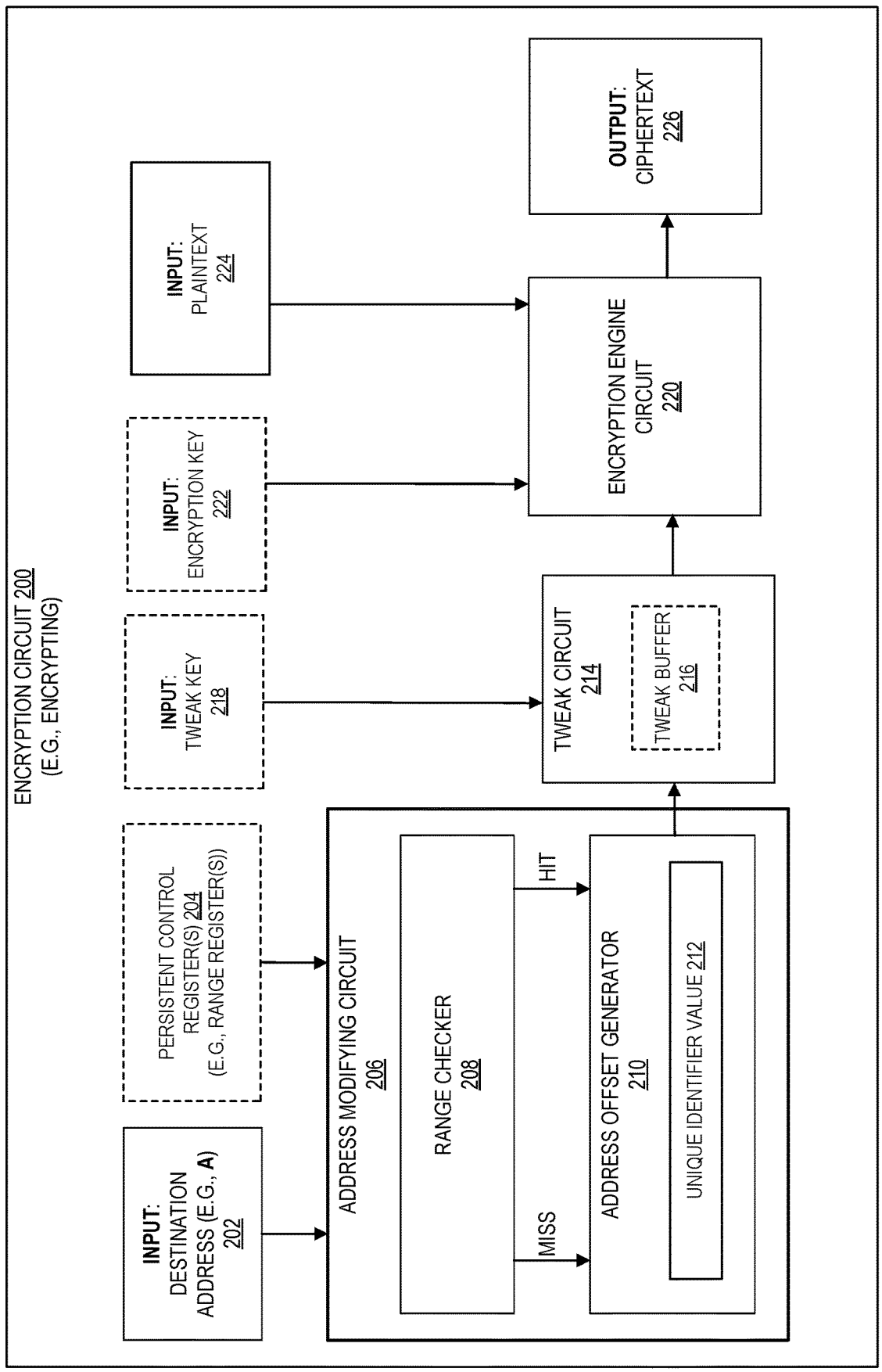
FIG. 2 illustrates a block diagram of an encryption circuit according to embodiments of the disclosure.

In one embodiment, the hardware initialization manager (non-transitory) storage 142 stores hardware initialization manager firmware (e.g., or software). In one embodiment, the hardware initialization manager (non-transitory) storage 142 stores Basic Input/Output System (BIOS) firmware. In another embodiment, the hardware initialization manager (non-transitory) storage 142 stores Unified Extensible Firmware Interface (UEFI) firmware. In certain embodiments (e.g., triggered by the power-on or reboot of a processor), computer system 100 (e.g., core 104) executes the hardware initialization manager firmware (e.g., or software) stored in hardware initialization manager (non-transitory) storage 142 to initialize the system 100 for operation, for example, to begin executing an operating system (OS) and/or initialize and test the (e.g., hardware) components of system 100. FIG. 2 illustrates a block diagram of an encryption circuit 200 according to embodiments of the disclosure. Encryption circuit 114 and/or encryption circuit 134 may be an instance of encryption circuit 200. In one embodiment, encryption circuit 200 operates according to an encryption standard (e.g., AES-XTS), e.g., while in MKTME mode. In one embodiment, AES-XTS encryption comprises:

1. T←AES(tweak_key, tweak)
2. PP←P XOR T
3. CC←AES(data_key, PP)
4. C←CC XOR T

Where, AES is encrypting according to an AES standard, P is the plaintext to be encrypted, and C is the final ciphertext for plaintext P.

In certain embodiments, tweak used in (1.) is generated based on the (e.g., physical) address where the plaintext is to be stored, e.g., to ensure that same data at different memory locations does not get encrypted to the same ciphertext (hence the name, tweak). In certain embodiments, the position dependent encryption (e.g., required from a security perspective), creates functional issues when used with persistent memory. More specifically, there can be situations where the base of persistent memory in the system changes, and thus the physical address itself (e.g., that was used to generate the tweak, and thus to produce the ciphertext) changes. One or more persistent memory ranges (for example, a proper subset of physical addresses that corresponds to non-volatile memory, e.g., in contrast to those physical addresses that corresponds to non-volatile memory) may be utilized. For example, a first range of memory addresses where a memory controller (e.g., memory controller circuit 116 in FIG. 1) writes directly to non-volatile memory (e.g., non-volatile memory 120B in FIG. 1), this may be referred to as app-direct (AD) range and/or a second (e.g., entirely different) range of memory addresses where a memory controller (e.g., memory controller circuit 116 in FIG. 1) writes first to volatile memory (e.g., volatile memory 120A in FIG. 1) as a cache, and the data is then written from the volatile memory to the non-volatile memory (e.g., non-volatile memory 120B in FIG. 1), this may be referred to as app-direct writeback (ADWB) range (e.g., using the volatile (e.g., DDR) memory as a cache for the persistent data). Example scenarios where persistent (e.g., AD/ADWB) memory ranges (e.g., base address) can move are listed below:

User adds volatile memory (e.g., 1 GB DDR5 DIMM capacity) to system (e.g., to socket 0 102 in FIG. 1) across cold boot. All AD-WB and AD addresses will move up by that amount of memory (e.g., 1 GB) in the system address map.

User adds non-volatile memory (e.g., 1 TB non-volatile DIMMs) to system (e.g., to socket 0 102 in FIG. 1) and configures all of it as two-level memory (2LM), all of these addresses will move up by that amount of memory (e.g., 1 TB) in the system address map.

User adds non-volatile memory (e.g., 1 TB non-volatile DIMMs) to socket 0 102 in FIG. 1 and configures all of it in AD mode, the AD range will move up by that amount of memory (e.g., 1 TB) for socket 1 122 in FIG. 1.

Hardware initialization manager code (e.g., BIOS firmware) detects error during volatile memory test and maps out (e.g., logically removed) one or more of the volatile memory devices (e.g., DDR DIMMs).

Hardware initialization manager code (e.g., BIOS firmware) determines that the volatile memory device (e.g., DDR DIMM) that was previously offlined due to error can now be enabled.

User enables memory sparing or mirroring.

System has a field programmable gate array (FPGA) attached and is reprogrammed with a new bitstream that affects the size of the FPGA's memory range.

Addition or removal of PCIe card that affects memory mapped input/output (MMIO) low size.

In the above, the tweak based on the physical address changes after the execution of the above scenarios. For persistent memory, this results in (e.g., permanent) data loss as the decryption uses an incorrect physical address to generate the tweak and returns incorrectly decrypted data (e.g., "garbage"). For volatile memory, the construction used is both secure and functional as there is no expectation for data to be retained for a change of the address map, e.g., no expectation for data to be retained across boots and/or within a boot cycle.

Embodiments herein utilize spatially unique position independent encryption. In certain embodiments of the proposed encryption scheme, the tweak used for persistent memory encryption is generated using an offset into the persistent memory region instead of using the address itself. Embodiments herein utilize spatially unique location independent encryption.

Encryption circuit 200 in FIG. 2 includes an address modifying circuit 206 which may implement spatially unique and location independent persistent memory encryption. For example, in one embodiment, 200 encryption circuit (for example, in response to a request to encrypt, e.g., an encrypt data for storage request), receives an input 202 of a destination address (e.g., address "A") (e.g., the destination address for plaintext 224). In certain embodiments, address modifying circuit 206 receives the input 202 of address "A" and first utilizes range checker 208 to compare that address to one or more persistent memory ranges (e.g., as indicated by persistent control register(s) 204). In certain embodiments when there is a "miss" (e.g., the address is not within one or more persistent memory ranges), the address modifying circuit 206 outputs the unmodified address "A" 202 as its output, e.g., to tweak circuit 214. In certain embodiments when there is a "hit" (e.g., the address is within one or more persistent memory ranges), the address modifying circuit 206 outputs a modified value (e.g., having the same width as the unmodified address "A") of "address "A"' as its output, e.g., to tweak circuit 214. In certain embodiments, the unique identifier value 212 is appended, e.g., concatenated) to a proper subset of bits of the address 202. The unique identifier value may be stored in one of persistent control registers 204 (e.g., in register 410 in FIG. 4). Unique identifier value 212 may be unique per persistent memory device (e.g., one unique identifier value for non-volatile memory 120B and one unique identifier value for non-volatile memory 120B in FIG. 1). Further discussion of a unique identifier value is below.

Tweak circuit 214 may then perform a tweak operation (e.g., using a tweak key 218) on the output from address modifying circuit 206 to generate a resultant tweak value, for example, and may then store the resultant tweak value in tweak buffer 216 (e.g., for use in a decryption as shown in FIG. 6). Tweak operation may be a tweak according to an encryption standard, e.g., according to an AEX-XTS standard. In certain embodiments, tweak circuit 214 may be part of encryption engine circuit 220.

In certain embodiments, encryption engine circuit 220 performs one or more encryption operations (e.g., according to an encryption standard) to the input 224 of plaintext and the input of the tweak value from tweak circuit 214 (e.g., and an input of an encryption key 222) to generate a resulting output 226 of ciphertext. Encryption key 222 may be an encryption key according to an encryption standard (e.g., an AES encryption key).

Encryption circuit 200 may perform a decryption operation, e.g., for a memory load request. For example, in one embodiment, 200 encryption circuit in decryption mode (for example, in response to a request to decrypt, e.g., a decrypt data from storage request), receives as inputs: a tweak value (e.g., from tweak buffer 216), encryption key 222, and ciphertext 226, and then generates the plaintext 224 therefrom.

In certain embodiments, for persistent memory ranges, address offset generator 210 is to modify the address A used for tweak generation so that the entire address A is not used as is (e.g., as in the case for non-persistent memory ranges), e.g., such that the modified version of A is computed and used for tweak generation. In certain embodiments, tweak generation with spatially unique location independent encryption is shown in the pseudocode below:

e.g., where MAXPHYS is the maximum number of physical address bits in the system, the <<< is a left shift, and the | is a bitwise logical OR operation. For example, if the input address A is 1016 and the base (e.g., persistent1.Base) is 1000, the offset is 16. In one embodiment, Persistent1's range (e.g., base to limit) denotes an ADWB range and Persistent2's range (e.g., base to limit) denotes an AD range.

In certain embodiments, on receipt of an address, a hardware range check is performed to determine if an incoming transaction is directed toward an (affected) persistent (e.g., AD/ADWB) address range. For example, at boot time, hardware initialization manager code (e.g., BIOS firmware) is to program range registers (e.g., registers 402, 404, 406, and 408) to cover (e.g., AD/ADWB) a plurality of ranges, e.g., which the encryption circuitry is to use to perform a range check for each incoming transaction. In certain embodiments, the result of the range check (Hit/Miss) is passed on.

In certain embodiments, if range hit, offset the address (A) used for tweak generation for (e.g., AD/AD-WB) in each socket to 0G, e.g., to a beginning page boundary (at 1 GB page granularity). For example, if the incoming address matches the persistent range, determine the offset of that incoming address within the persistent range, e.g., by subtracting the base address of the persistent range from A and the intermediate result is (A−persistent1.Base) which is passed on, e.g., to a tweak circuit (e.g., tweak engine circuit).

In certain embodiments, if range hit, uniquify the address across all the system (e.g., across all sockets/memory controllers (MCs)/Channels) and determine the value of A', which is passed on, e.g., to a tweak circuit (e.g., tweak engine circuit). In certain embodiments, the computed offset can be subject to aliasing, e.g., which breaks security requirements. Therefore, in certain embodiments, the offset is to undergo further (e.g., logical bit) operations to uniquify it across the entire system. The final value of A' (e.g., for use as an input in a tweak circuit) in certain embodiments is then computed as follows A'=(A−persistent1.Base) |APPEND_ID<<<MAXPHYS; where APPEND_ID: is a unique (e.g., 12 bit ID) to append to (e.g., AD/ADWB) tweak input address. In certain embodiments, this ID should be unique across the entire system, e.g., and contain SocketID, MC_ID, and Channel_ID. In one embodiment, hardware initialization manager code (e.g., BIOS firmware) is to program APPEND_ID as {SocketID,MC_ID,Channel_ID} to avoid aliasing across memory channels across the entire system; where the operator "," indicates concatenation, and MAXPHYS denotes the maximum number of physical address bits in the system (e.g., processor thereof).

In certain embodiments, if range hit, use modified A (e.g., A') as the input address for tweak generation instead of unmodified A, and if range miss, use the unmodified A as the input address for tweak generation. In one embodiment, a range miss implies that the incoming address does not belong to an affected persistent (e.g., AD/ADWB) range,

```
If (persistent1.base < A < persistent1.limit)      //This is persistent1 (AD_WB)
access
        AES Tweak input (A') = ((A − persistent1.Base) | APPEND_ID<<
        MAXPHYS))
    else if (persistent2.base < A < persistent2.limit) //This is persistent2 (AD) access
        AES Tweak input (A') = ((A − persistent2.Base) | APPEND_ID<<
        MAXPHYS))
    else
        AES Tweak input (A') = A              //Range Check Misses
``` e.g., the address modification (e.g., by address offset generator 210) may be bypassed.

Certain embodiments described above provide the flexibility for device migration where a persistent memory device can be moved to another platform, but it may require the APPEND_ID (e.g., the socket/MC/channel) to stay consistent across the move to prevent data loss. Alternatively, the below embodiment does away with this restriction by assigning (e.g., at manufacturing time) a unique identifier value to a (e.g., each) persistent memory device. In one embodiment, hardware initialization manager code (e.g., BIOS firmware) is to, at boot time, read this unique identifier from each persistent memory device and program it into the encryption engine (e.g., into register 410 in FIG. 4). For example, such that the uniquifying across sockets/MCs/channels is achieved by appending the device unique identifier to the offset in the persistent memory range. The tweak construction with this alternate embodiment is shown in the pseudocode example below:

embodiment, these registers are programmed (e.g., associated values stored therein) by the system (comprising these registers) executing hardware initialization manager code (e.g., BIOS firmware).

FIG. 4 illustrates persistent control registers 400 and their example formats 402-410 according to embodiments of the disclosure. Persistent control registers herein may include one or any combination of persistent control registers 400. In one embodiment, the values stored therein may be stored in a single (e.g., vector) register. In FIG. 4, persistent control registers 400 includes a register 402 indicating the base address of a first persistent range, a register 404 indicating the limit (e.g., maximum) address of the first persistent range, a register 406 indicating the base address of a second persistent range, a register 408 indicating the limit (e.g., maximum) address of the second persistent range, and a register 410 indicating persistent address identification values (e.g., unique identifier value(s)). The bit indexes (e.g., [bits 21:0] for the base field in register 402) and other fields

```
If (persistent1.base < A < persistent1.limit)    //This is persistent1 (AD_WB) access
    AES Tweak input (A') = ((A − persistent1.Base) | DEVICE_ID))
else if (persistent2.base < A < persistent2.limit) //This is persistent2 (AD) access
    AES Tweak input (A') = ((A − persistent2.Base) | DEVICE_ID))
else
    AES Tweak input (A') = A              //Range Check Misses
```

In certain embodiments, when a new non-volatile memory (e.g., 1 TB non-volatile DIMMs) device with an AD range is added to a system (e.g., socket), hardware initialization manager code (e.g., BIOS firmware) is to ensure it is mapped above existing AD memory in the system (e.g., in that socket) so that the tweak values associated with existing AD memory remain unchanged and there is no data loss.

Figure 3:
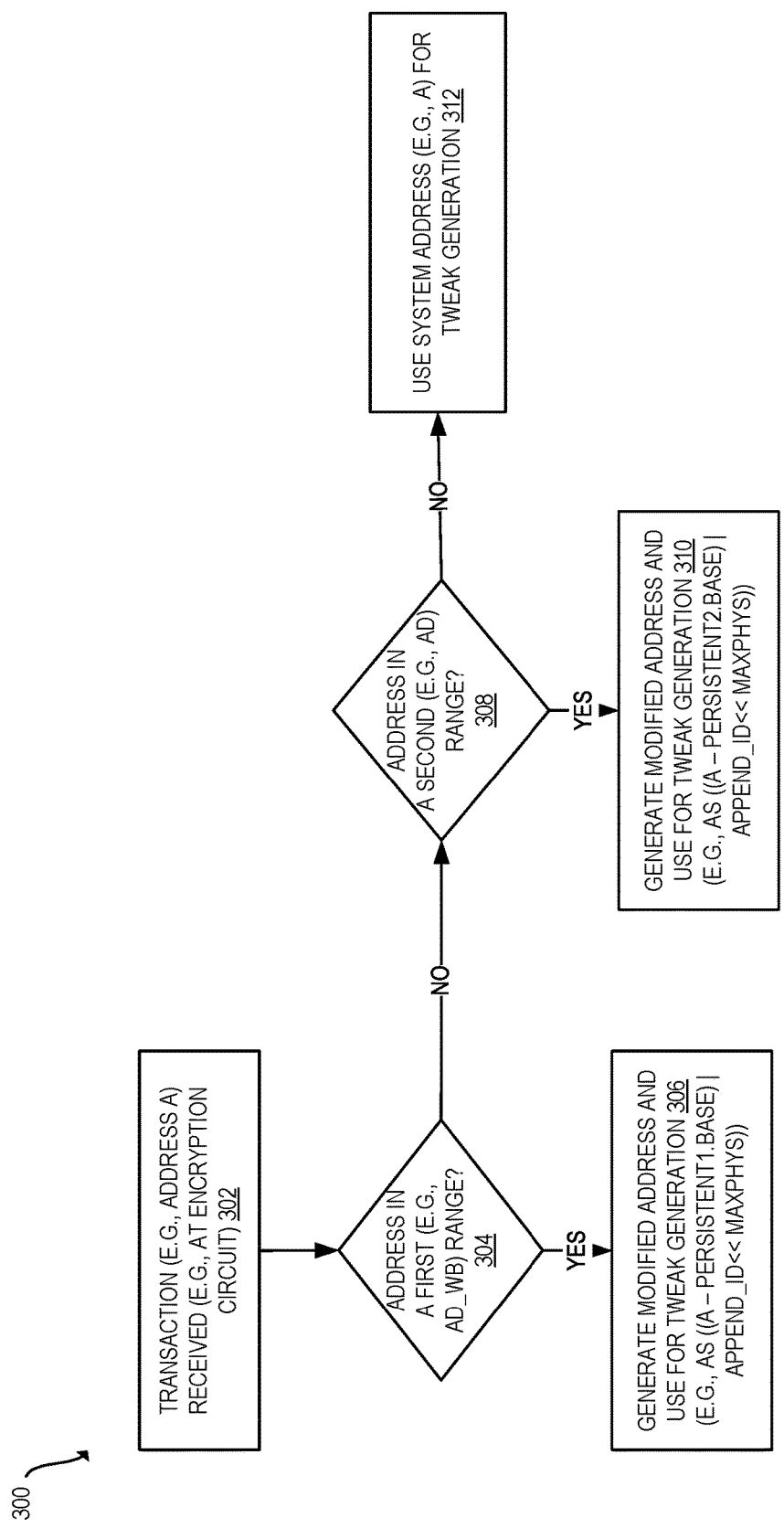
FIG. 3 is a block flow diagram illustrating operations of a method of address modification for a plurality of persistent memory ranges according to embodiments of the disclosure.

FIG. 3 is a block flow diagram illustrating operations 300 of a method of address modification for a plurality of persistent memory ranges according to embodiments of the disclosure. In certain embodiments, when an encryption circuit (e.g., encryption circuit 200) receives an encryption request at 302 with address A (e.g., when a TME (Total Memory Encryption) encryption circuit receives a CMI (Converged Memory Interface) request with address A), encryption circuit is to determine if A belongs to a persistent memory range (e.g., AD or AD_WB). For example, encryption circuit is to check at 304 if the address is in a first (e.g., AD_WB) range and if yes, then generate a modified "address" and use that for tweak generation at 306, and if no, check at 308 if the address is in a second (e.g., AD) range and if yes, then generate a modified "address" and use that for tweak generation at 310, and if no, use system address (e.g., unmodified address) for tweak generation at 312. In one embodiment, the modified address is created from an input of address A to an output of address A' by removing A's offset and then appending a unique identifier value (e.g., APPEND_ID) to make A' unique across the system, e.g., unique across sockets, memory controllers, channels, or any one or combination thereof.

In certain embodiments, the Persistent1 (e.g., AD-WB) and Persistent2 (e.g., AD) ranges apply to transactions with MKTME virtual machine (VM) Keys, for example, where if a transaction comes in with a platform key ID (e.g., KeyID 0) and also matches the Persistent1 (e.g., AD_WB) or Persistent2 (e.g., AD) ranges, encryption is bypassed.

Following illustrates the various registers that may be added to a system (e.g., to a processor thereof). In one herein (e.g., including the reserved (RSVD) fields) are examples. In certain embodiments, unique identifier value (e.g., APPEND_ID) is unique for each socket, e.g., such that each socket has its own register 410.

Figure 5:
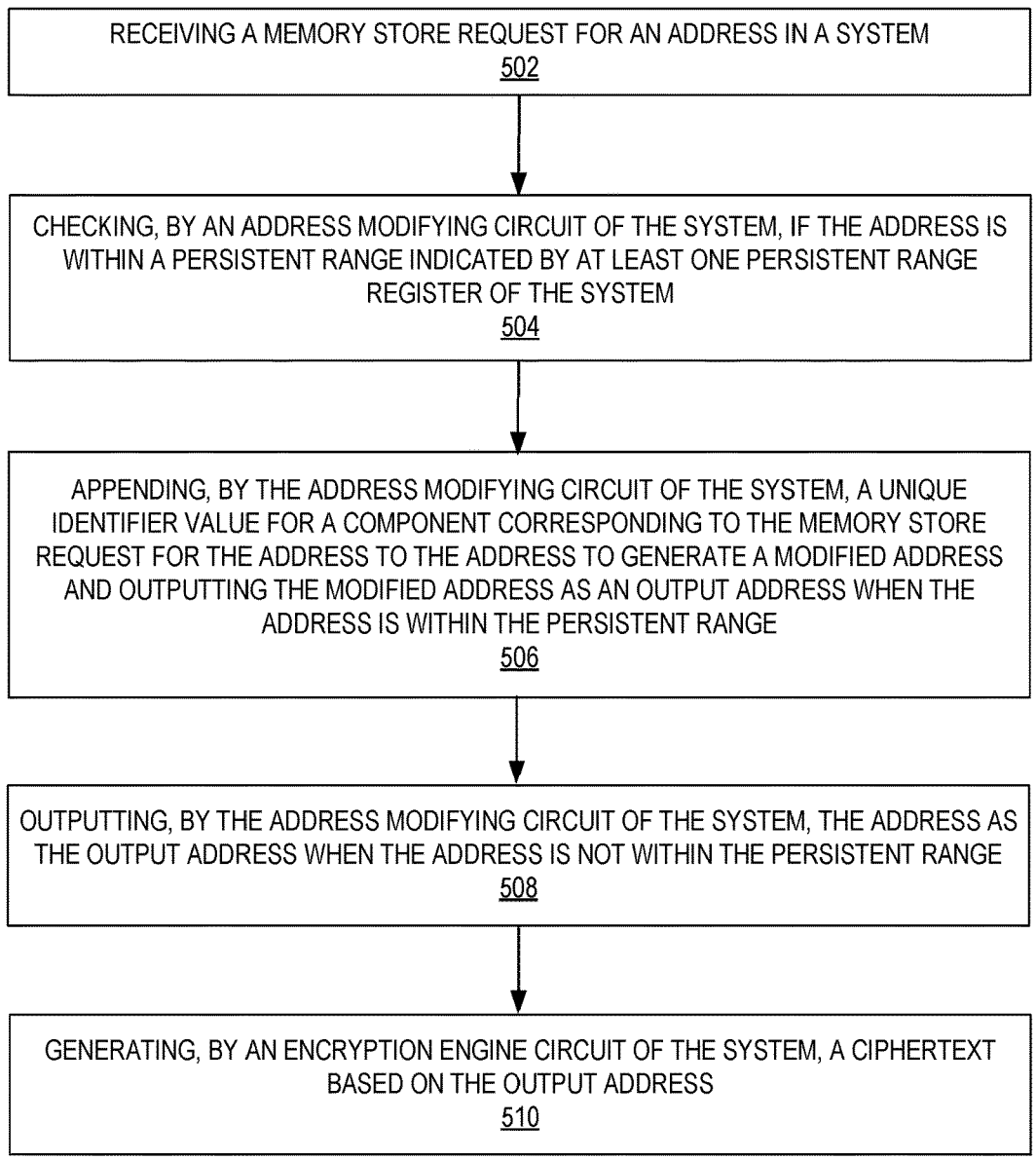
FIG. 5 is a block flow diagram illustrating operations of a method of generating a ciphertext according to embodiments of the disclosure.

FIG. 5 is a block flow diagram illustrating operations 500 of a method of generating a ciphertext according to embodiments of the disclosure. Some or all of the operations 500 (or other processes described herein, or variations, and/or combinations thereof) are performed under the control of an encryption circuit.

The operations 500 include, at block 502, receiving a memory store request for an address in a system. The operations 500 further include, at block 504, checking, by an address modifying circuit of the system, if the address is within a persistent range indicated by at least one persistent range register of the system. The operations 500 further include, at block 506, appending, by the address modifying circuit of the system, a unique identifier value for a component corresponding to the memory store request for the address to the address to generate a modified address and outputting the modified address as an output address when the address is within the persistent range. The operations 500 further include, at block 508, outputting, by the address modifying circuit of the system, the address as the output address when the address is not within the persistent range. The operations 500 further include, at block 510, generating, by an encryption engine circuit of the system, a ciphertext based on the output address.

Exemplary architectures, systems, etc. that the above may be used in are detailed below. Exemplary instruction formats that may cause a decryption, an encryption, a read (e.g., and a decryption), and/or a write (e.g., and an encryption) are detailed below.

At least some embodiments of the disclosed technologies can be described in view of the following examples:
Example 1. An apparatus comprising:
  at least one persistent range register to indicate a persistent range of memory;

an address modifying circuit to check if an address for a memory store request is within the persistent range indicated by the at least one persistent range register, and:
   append a unique identifier value, for a component corresponding to the memory store request for the address, to the address to generate a modified address and output the modified address as an output address when the address is within the persistent range, and
   output the address as the output address when the address is not within the persistent range; and
an encryption engine circuit to generate a ciphertext based on the output address.

Example 2. The apparatus of example 1, wherein the unique identifier value is unique across a multiple socket processor system comprising the apparatus.

Example 3. The apparatus of example 2, wherein the unique identifier value comprises a socket identification value, a memory controller identification value, and a channel identification value.

Example 4. The apparatus of example 1, wherein the memory is a non-volatile random-access memory device and the unique identifier value is assigned to the non-volatile random-access memory device at manufacturing time.

Example 5. The apparatus of example 1, wherein the address modifying circuit is to remove a persistent base address indicated by a persistent base address register from the address to generate an offset into the persistent range, and the unique identifier value is appended to the offset to generate the modified address.

Example 6. The apparatus of example 1, wherein the at least one persistent range register comprises at least one first persistent range register for a first persistent range of memory and at least one second persistent range register for a second persistent range of memory, and the address modifying circuit is to:
   when the address is within the first persistent range of memory, remove a first persistent base address indicated by at least one persistent base address register from the address to generate a first offset into the persistent range, and append the unique identifier value to the first offset to generate the modified address; and
   when the address is within the second persistent range of memory, remove a second, different persistent base address indicated by the at least one persistent base address register from the address to generate a second offset into the persistent range, and append the unique identifier value to the second offset to generate the modified address.

Example 7. The apparatus of example 6, wherein the first persistent range of memory is a range of non-volatile memory (e.g., non-volatile RAM) that is directly written to by a memory controller, and the second persistent range of memory is a range of non-volatile memory that is indirectly written to by a memory controller via writing to a volatile memory (e.g., volatile RAM).

Example 8. The apparatus of example 1, further comprising a tweak circuit to perform a tweak operation on the output address from the address modifying circuit to generate a tweak value that is used by the encryption engine circuit to generate the ciphertext.

Example 9. The apparatus of example 8, further comprising a tweak buffer to store a copy of the tweak value, wherein the encryption engine circuit is to use the copy of the tweak value for a decryption operation for the ciphertext encrypted with the tweak value.

Example 10. A method comprising:
   receiving a memory store request for an address in a system;
   checking, by an address modifying circuit of the system, if the address is within a persistent range indicated by at least one persistent range register of the system;
   appending, by the address modifying circuit of the system, a unique identifier value for a component corresponding to the memory store request for the address to the address to generate a modified address and outputting the modified address as an output address when the address is within the persistent range;
   outputting, by the address modifying circuit of the system, the address as the output address when the address is not within the persistent range; and
   generating, by an encryption engine circuit of the system, a ciphertext based on the output address.

Example 11. The method of example 10, wherein the system is a multiple socket processor system, and the unique identifier value is unique across the multiple socket processor system.

Example 12. The method of example 11, wherein the unique identifier value comprises a socket identification value, a memory controller identification value, and a channel identification value.

Example 13. The method of example 10, wherein the memory is a non-volatile random-access memory device and the unique identifier value is assigned to the non-volatile random-access memory device at manufacturing time.

Example 14. The method of example 10, further comprising removing, by the address modifying circuit, a persistent base address indicated by a persistent base address register from the address to generate an offset into the persistent range, wherein the appending comprises appending the unique identifier value to the offset to generate the modified address.

Example 15. The method of example 10, further comprising:
   when the address is within a first persistent range of memory indicated by at least one first persistent range register, removing a first persistent base address indicated by at least one persistent base address register from the address to generate a first offset into the persistent range, wherein the appending comprises appending the unique identifier value to the first offset to generate the modified address, and
   when the address is within a second persistent range of memory indicated by at least one second persistent range register, removing a second, different persistent base address indicated by the at least one persistent base address register from the address to generate a second offset into the persistent range, wherein the appending comprises appending the unique identifier value to the second offset to generate the modified address.

Example 16. The method of example 10, further comprising performing a tweak operation, by a tweak circuit of the system, on the output address from the address modifying circuit to generate a tweak value that is used by the encryption engine circuit to generate the ciphertext.

Example 17. The method of example 16, further comprising storing a copy of the tweak value in a tweak buffer of the system and using the copy of the tweak value for a decryption operation for the ciphertext encrypted with the tweak value.

Example 18. A non-transitory machine readable medium that stores program code that when executed by a machine causes the machine to perform a method comprising:

receiving a memory store request for an address in a system;

checking, by an address modifying circuit of the system, if the address is within a persistent range indicated by at least one persistent range register of the system;

appending, by the address modifying circuit of the system, a unique identifier value for a component corresponding to the memory store request for the address to the address to generate a modified address and outputting the modified address as an output address when the address is within the persistent range;

outputting, by the address modifying circuit of the system, the address as the output address when the address is not within the persistent range; and generating, by an encryption engine circuit of the system, a ciphertext based on the output address.

Example 19. The non-transitory machine readable medium of example 18, wherein the system is a multiple socket processor system, and the unique identifier value is unique across the multiple socket processor system.

Example 20. The non-transitory machine readable medium of example 19, wherein the unique identifier value comprises a socket identification value, a memory controller identification value, and a channel identification value.

Example 21. The non-transitory machine readable medium of example 18, wherein the memory is a non-volatile random-access memory device and the unique identifier value is assigned to the non-volatile random-access memory device at manufacturing time.

Example 22. The non-transitory machine readable medium of example 18, further comprising removing, by the address modifying circuit, a persistent base address indicated by a persistent base address register from the address to generate an offset into the persistent range, wherein the appending comprises appending the unique identifier value to the offset to generate the modified address.

Example 23. The non-transitory machine readable medium of example 18, further comprising:

when the address is within a first persistent range of memory indicated by at least one first persistent range register, removing a first persistent base address indicated by at least one persistent base address register from the address to generate a first offset into the persistent range, wherein the appending comprises appending the unique identifier value to the first offset to generate the modified address, and when the address is within a second persistent range of memory indicated by at least one second persistent range register, removing a second, different persistent base address indicated by the at least one persistent base address register from the address to generate a second offset into the persistent range, wherein the appending comprises appending the unique identifier value to the second offset to generate the modified address.

Example 24. The non-transitory machine readable medium of example 18, further comprising performing a tweak operation, by a tweak circuit of the system, on the output address from the address modifying circuit to generate a tweak value that is used by the encryption engine circuit to generate the ciphertext.

Example 25. The non-transitory machine readable medium of example 24, further comprising storing a copy of the tweak value in a tweak buffer of the system and using the copy of the tweak value for a decryption operation for the ciphertext encrypted with the tweak value.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
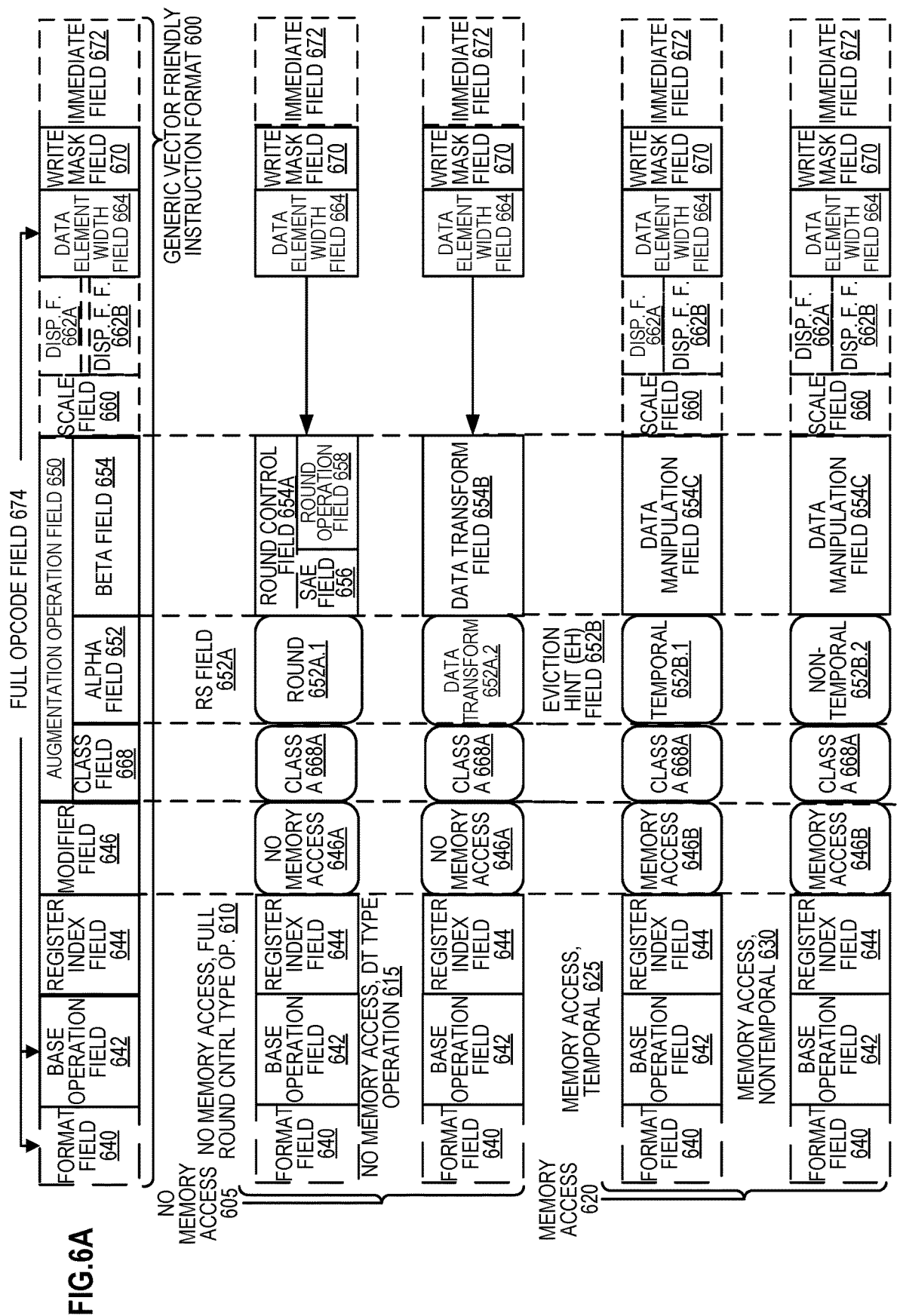
FIG. 6A is a block diagram illustrating a generic vector friendly instruction format and class A instruction templates thereof according to embodiments of the disclosure.
Figure 6B:
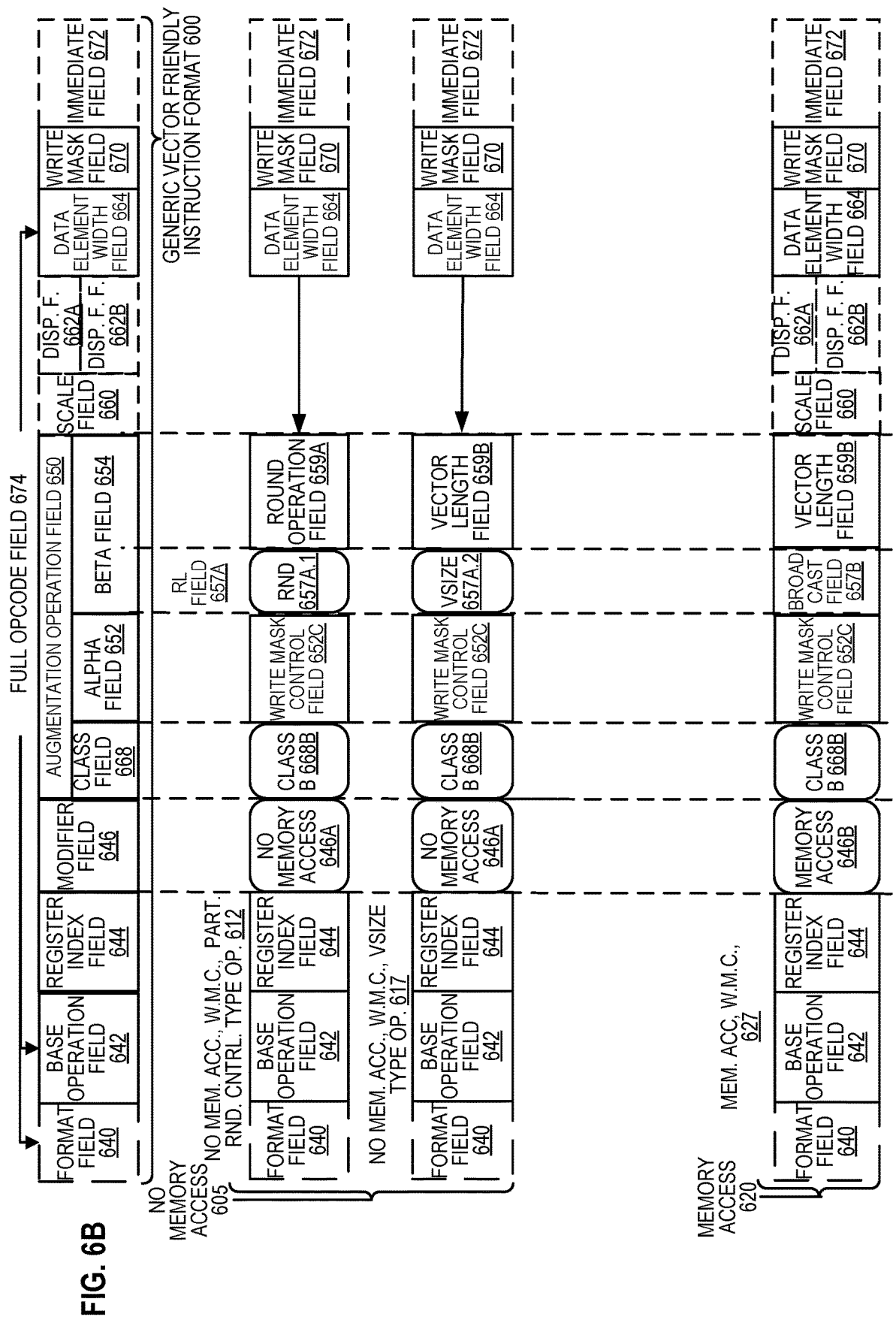
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}$*index+base).

Displacement Field 662A—its content is used as part of memory address generation (e.g., for address generation that uses $2^{scale}$*index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that it is not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

Figure 7A:
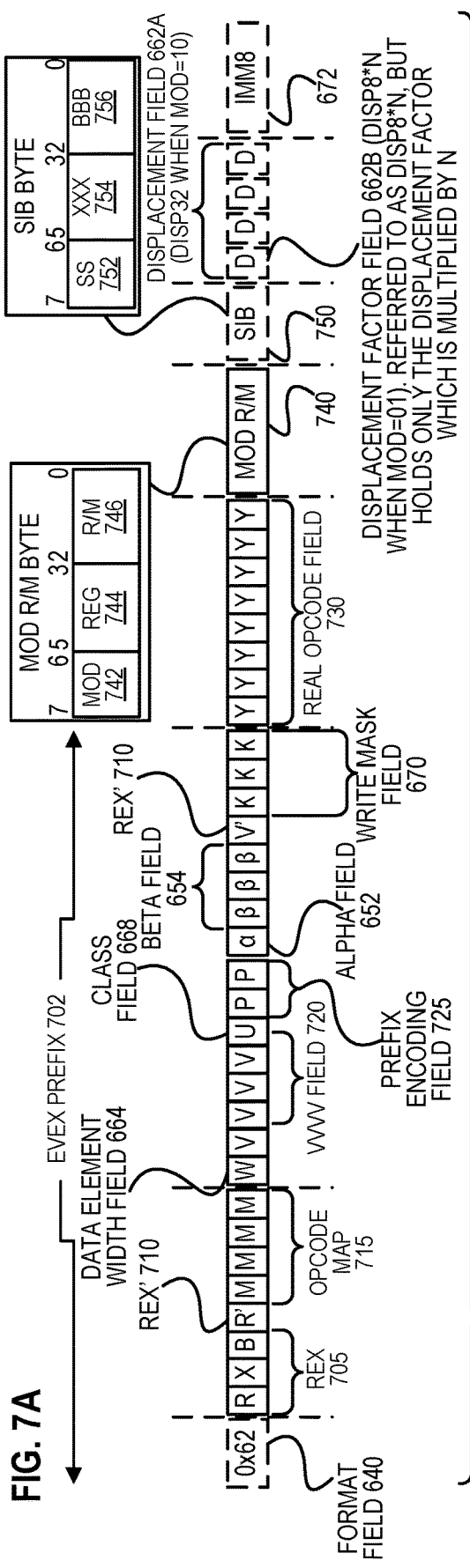
FIG. 7A is a block diagram illustrating fields for the generic vector friendly instruction formats in FIGS. 6A and 6B according to embodiments of the disclosure.

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0×62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (is complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (Is complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

Figure 7B:
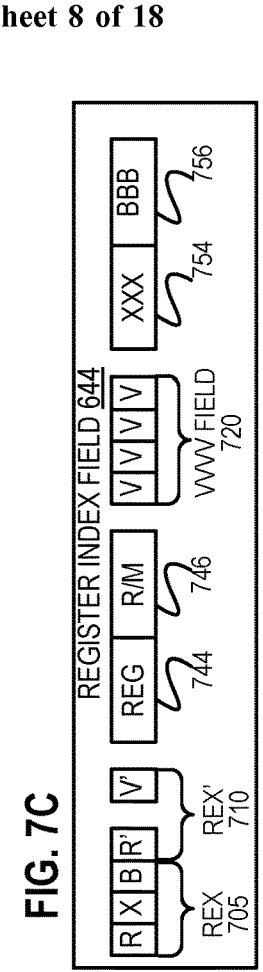
FIG. 7B is a block diagram illustrating the fields of the specific vector friendly instruction format in FIG. 7A that make up a full opcode field according to one embodiment of the disclosure.

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

Figure 7C:
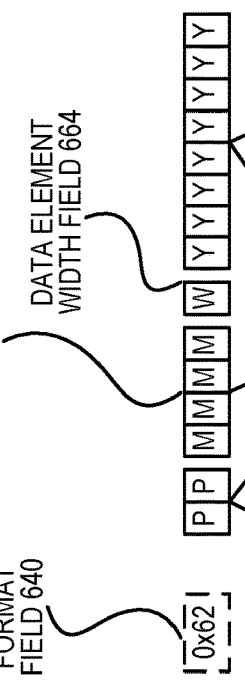
FIG. 7C is a block diagram illustrating the fields of the specific vector friendly instruction format in FIG. 7A that make up a register index field according to one embodiment of the disclosure.

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
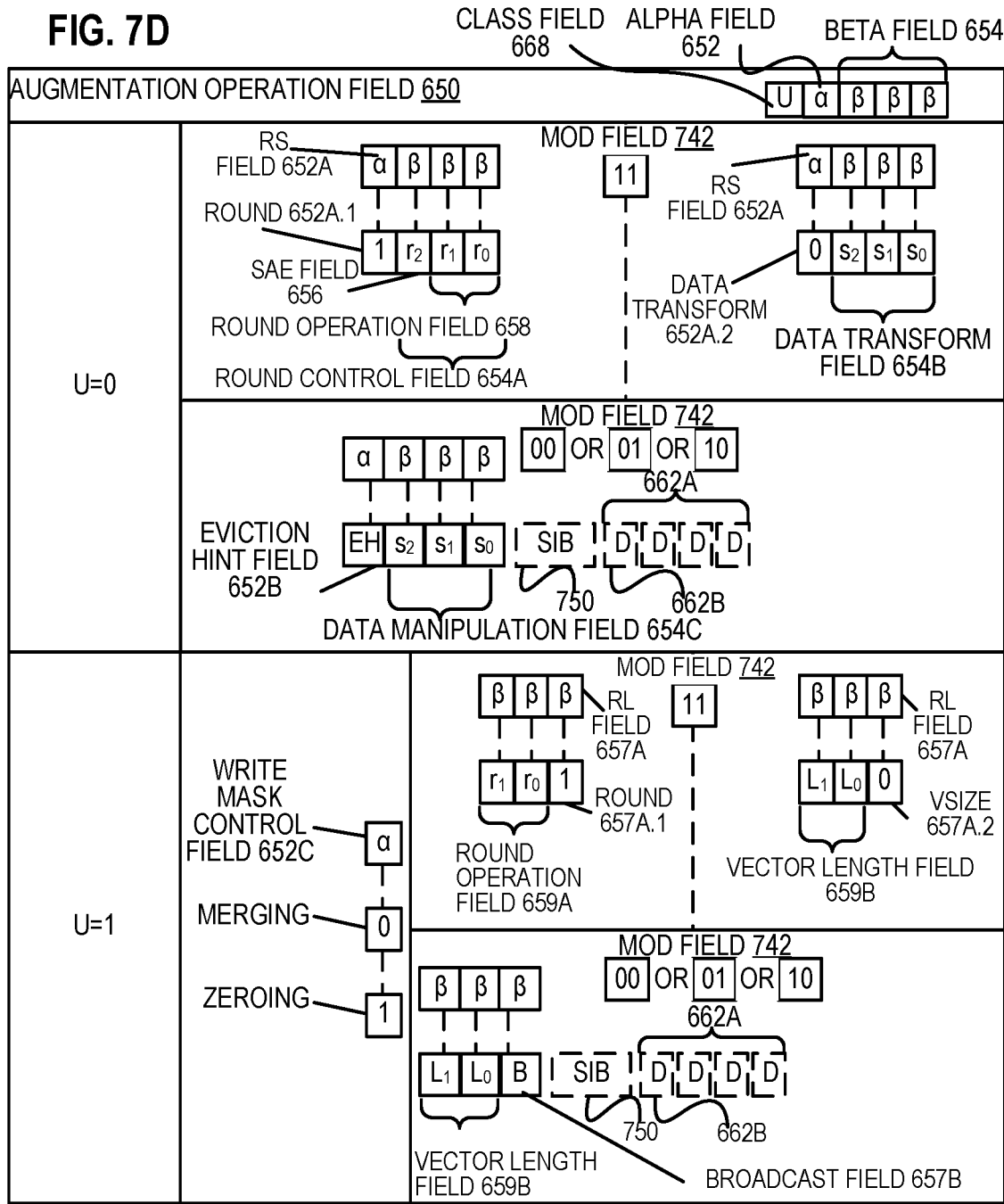
FIG. 7D is a block diagram illustrating the fields of the specific vector friendly instruction format in FIG. 7A that make up the augmentation operation field 650 according to one embodiment of the disclosure.

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
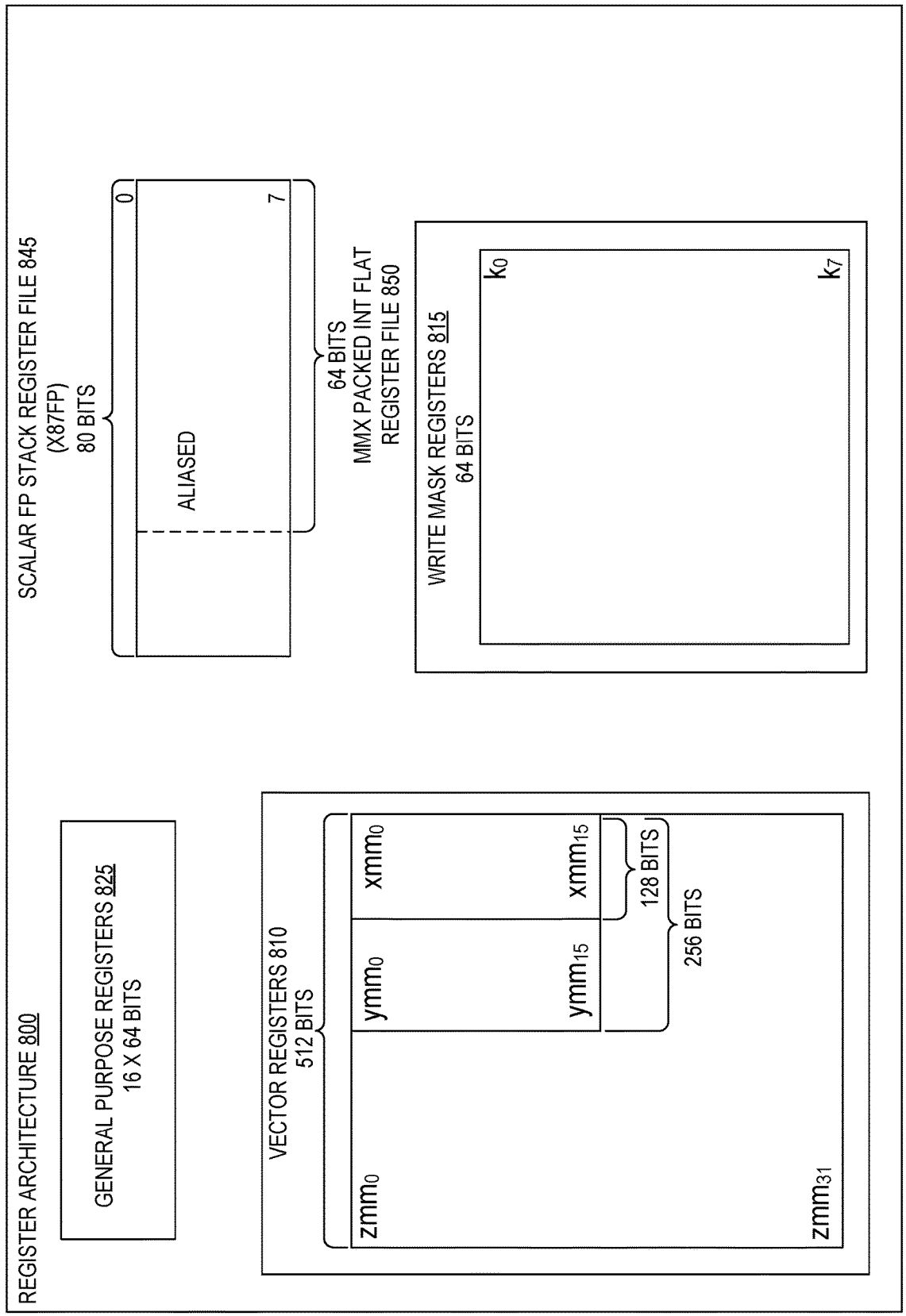
FIG. 8 is a block diagram of a register architecture according to one embodiment of the disclosure

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

In certain embodiments, a prefetch circuit 978 is included to prefetch data, for example, to predict access addresses and bring the data for those addresses into a cache or caches (e.g., from memory 980).

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
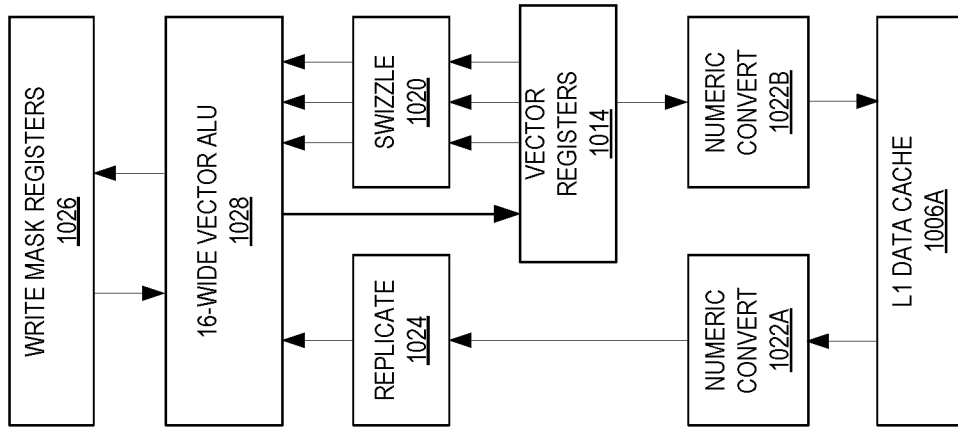
FIG. 10B is an expanded view of part of the processor core in FIG. 10A according to embodiments of the disclosure.
Figure 10A:
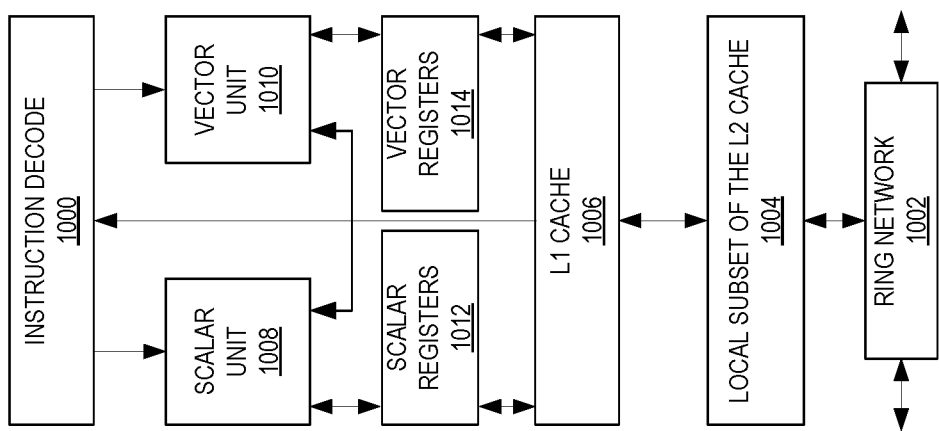
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
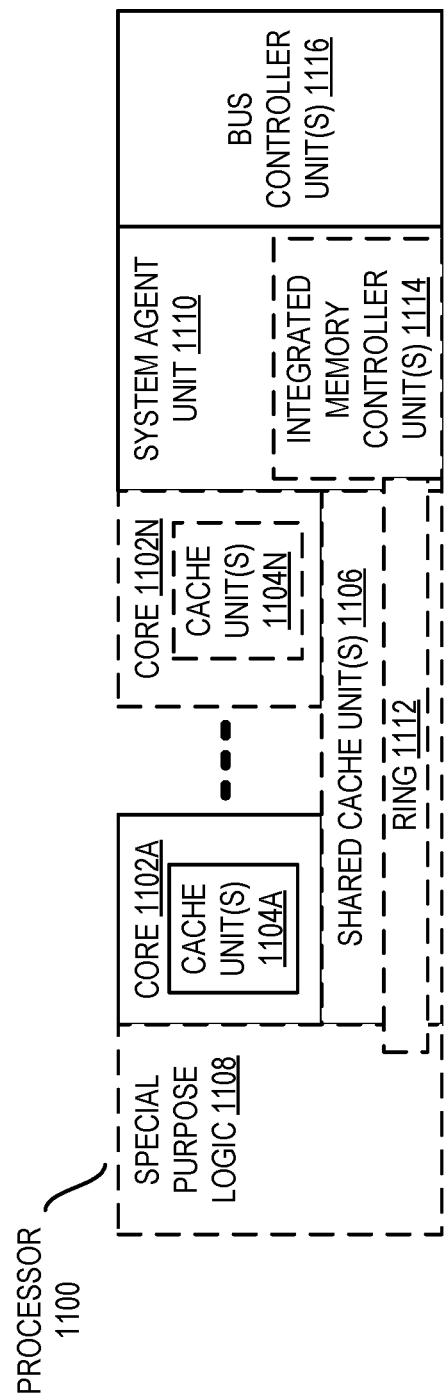
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
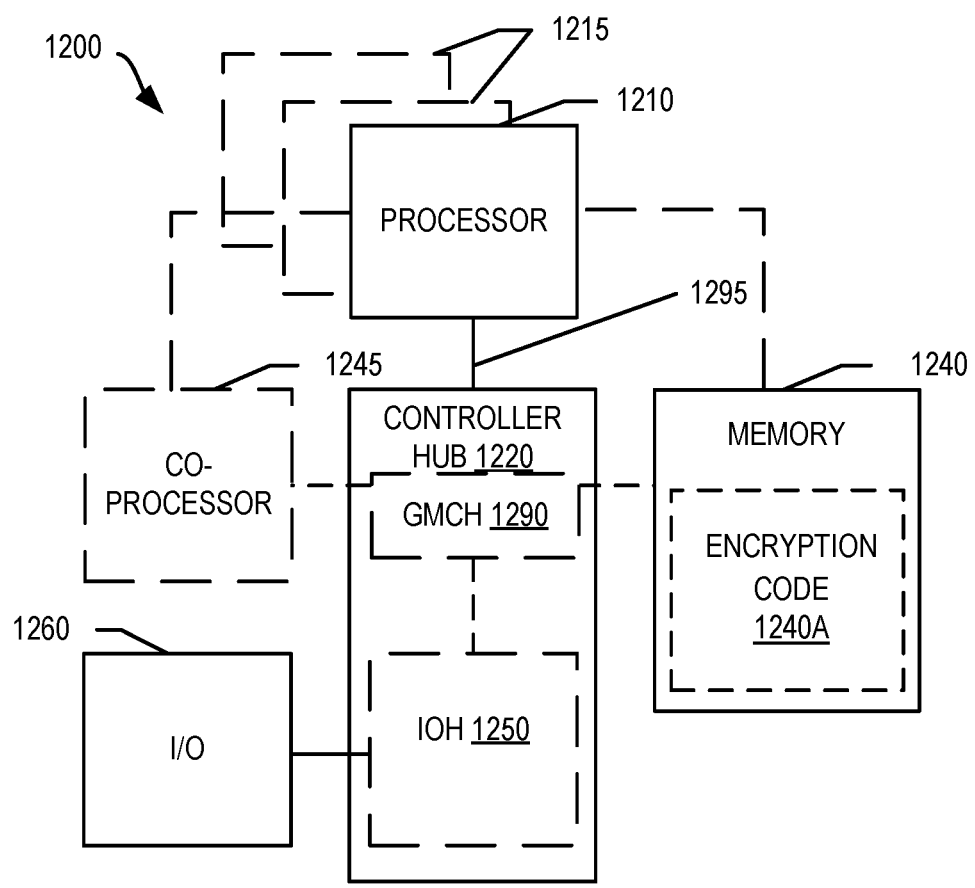
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include encryption (e.g., and decryption) code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
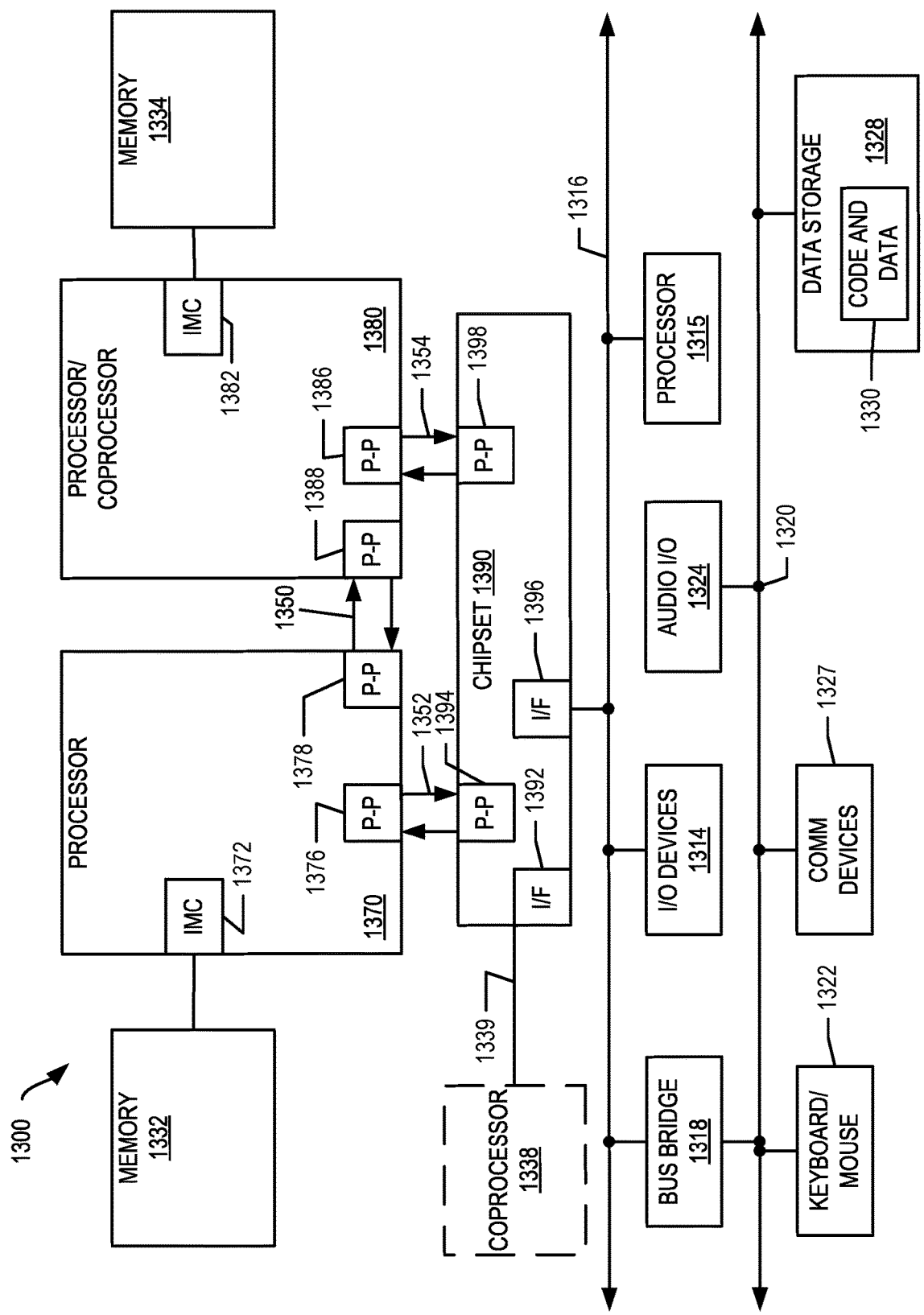
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
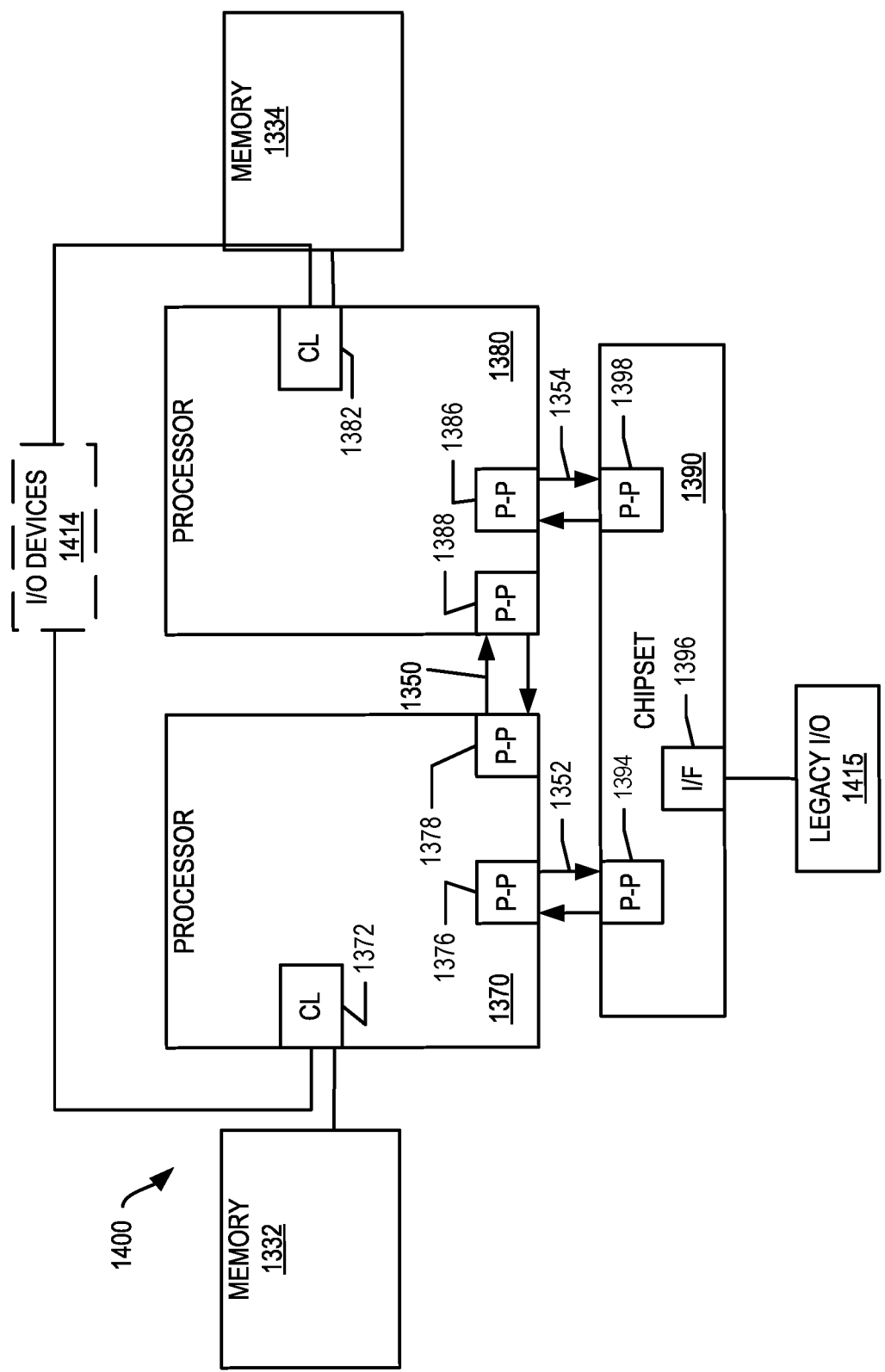
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
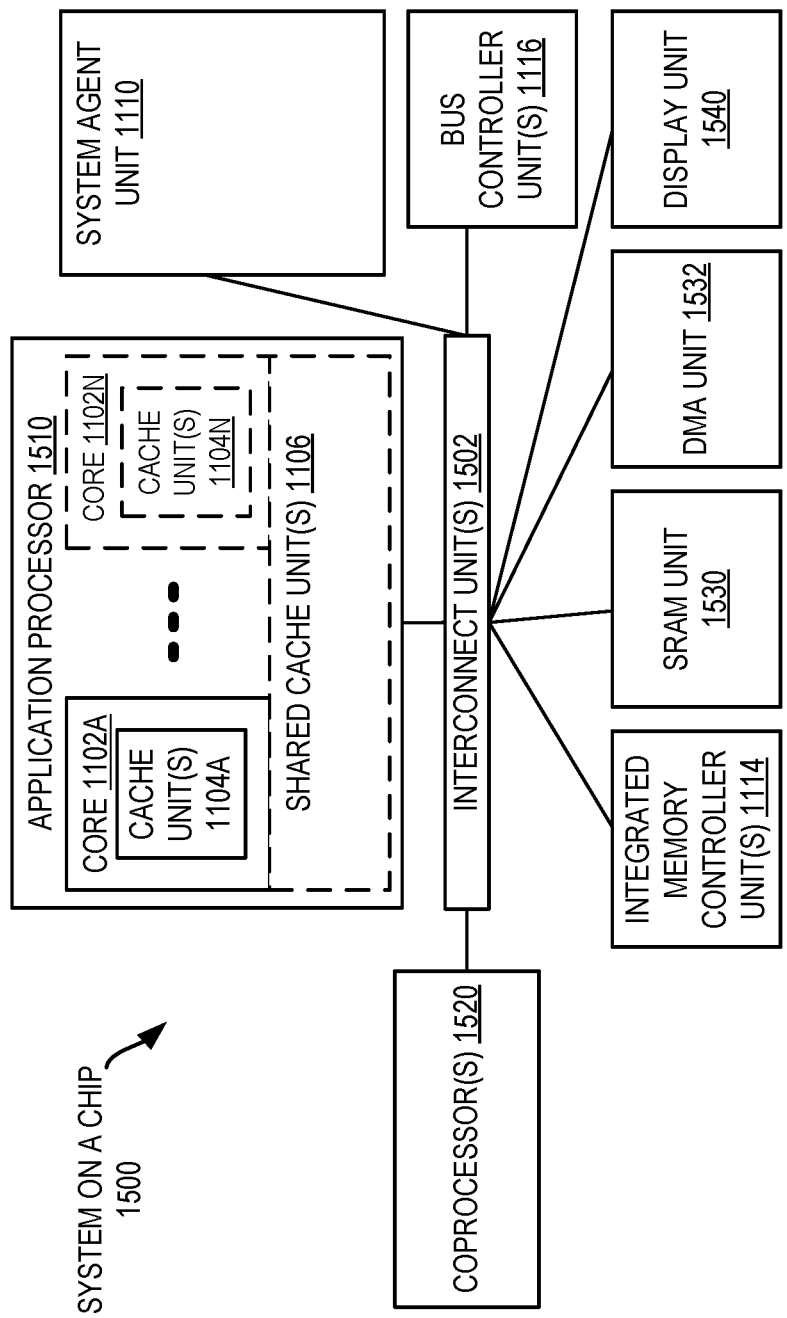
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

Figure 16:
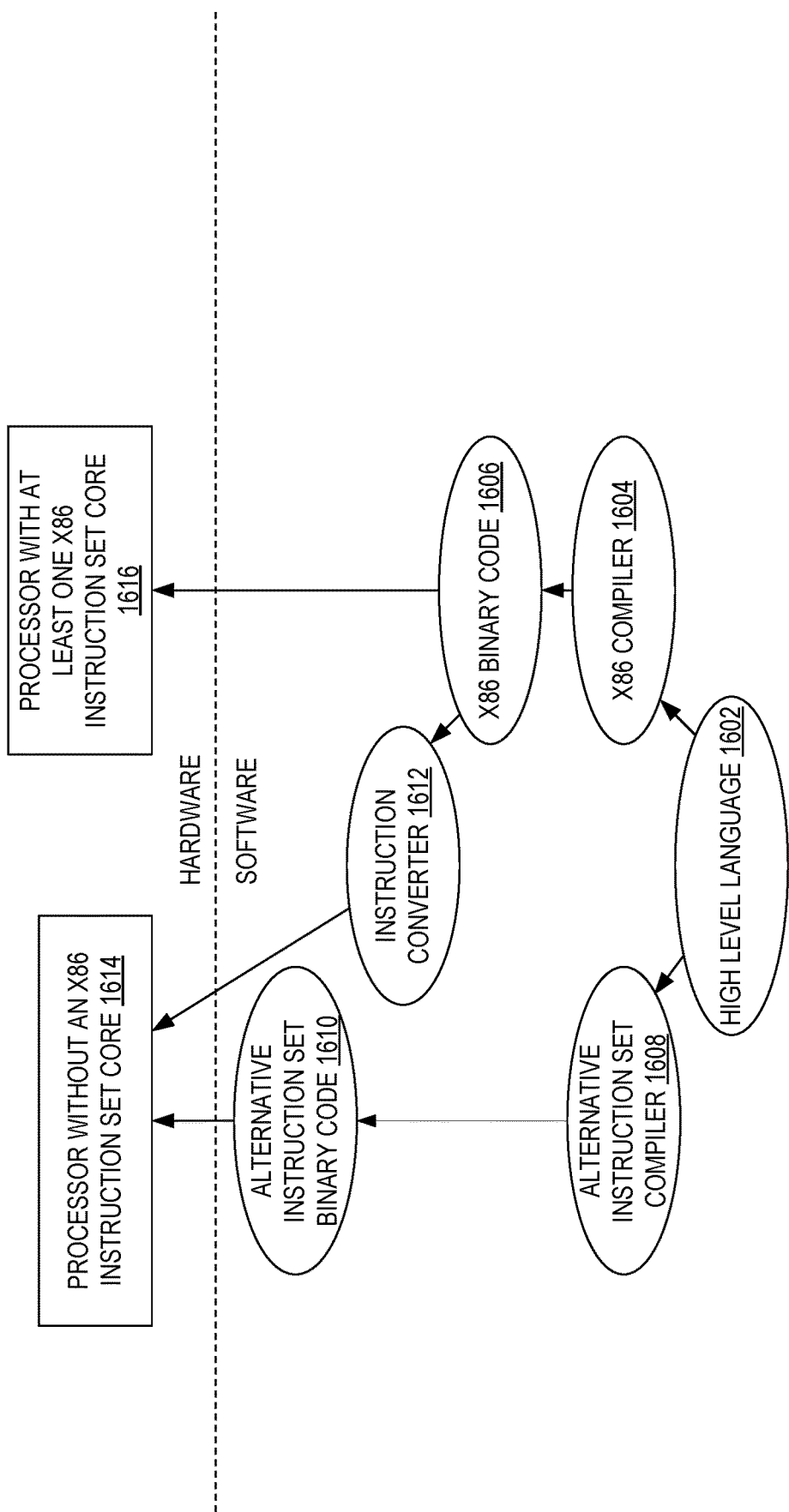
FIG. 16 is a block diagram contrasting the use of a software instruction converter to convert binary instructions in a source instruction set to binary instructions in a target instruction set according to embodiments of the disclosure.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor. FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
   at least one persistent range register to indicate a persistent range of memory;
   an address modifying circuit to check if an address for a memory store request is within the persistent range indicated by the at least one persistent range register, and:
      append a unique identifier value, for a component corresponding to the memory store request for the address, to the address to generate a modified address and output the modified address as an output address when the address is within the persistent range, and
      output the address as the output address when the address is not within the persistent range; and
   an encryption engine circuit to generate a ciphertext based on the output address.

2. The apparatus of claim 1, wherein the unique identifier value is unique across a multiple socket processor system comprising the apparatus.

3. The apparatus of claim 2, wherein the unique identifier value comprises a socket identification value, a memory controller identification value, and a channel identification value.

4. The apparatus of claim 1, wherein the memory is a non-volatile random-access memory device and the unique identifier value is assigned to the non-volatile random-access memory device at manufacturing time.

5. The apparatus of claim 1, wherein the address modifying circuit is to remove a persistent base address indicated by a persistent base address register from the address to generate an offset into the persistent range, and the unique identifier value is appended to the offset to generate the modified address.

6. The apparatus of claim 1, wherein the at least one persistent range register comprises at least one first persistent range register for a first persistent range of memory and at least one second persistent range register for a second persistent range of memory, and the address modifying circuit is to:
   when the address is within the first persistent range of memory, remove a first persistent base address indicated by at least one persistent base address register from the address to generate a first offset into the persistent range, and append the unique identifier value to the first offset to generate the modified address; and
   when the address is within the second persistent range of memory, remove a second, different persistent base address indicated by the at least one persistent base address register from the address to generate a second offset into the persistent range, and append the unique identifier value to the second offset to generate the modified address.

7. The apparatus of claim 1, further comprising a tweak circuit to perform a tweak operation on the output address from the address modifying circuit to generate a tweak value that is used by the encryption engine circuit to generate the ciphertext.

8. The apparatus of claim 7, further comprising a tweak buffer to store a copy of the tweak value, wherein the encryption engine circuit is to use the copy of the tweak value for a decryption operation for the ciphertext encrypted with the tweak value.

9. A method comprising:
   receiving a memory store request for an address in a system;
   checking, by an address modifying circuit of the system, if the address is within a persistent range indicated by at least one persistent range register of the system;
   appending, by the address modifying circuit of the system, a unique identifier value for a component corresponding to the memory store request for the address to the address to generate a modified address and outputting the modified address as an output address when the address is within the persistent range;
   outputting, by the address modifying circuit of the system, the address as the output address when the address is not within the persistent range; and
   generating, by an encryption engine circuit of the system, a ciphertext based on the output address.

10. The method of claim 9, wherein the system is a multiple socket processor system, and the unique identifier value is unique across the multiple socket processor system.

11. The method of claim 10, wherein the unique identifier value comprises a socket identification value, a memory controller identification value, and a channel identification value.

12. The method of claim 9, wherein the memory is a non-volatile random-access memory device and the unique identifier value is assigned to the non-volatile random-access memory device at manufacturing time.

13. The method of claim 9, further comprising removing, by the address modifying circuit, a persistent base address indicated by a persistent base address register from the address to generate an offset into the persistent range, wherein the appending comprises appending the unique identifier value to the offset to generate the modified address.

14. The method of claim 9, further comprising:
when the address is within a first persistent range of memory indicated by at least one first persistent range register, removing a first persistent base address indicated by at least one persistent base address register from the address to generate a first offset into the persistent range, wherein the appending comprises appending the unique identifier value to the first offset to generate the modified address, and
when the address is within a second persistent range of memory indicated by at least one second persistent range register, removing a second, different persistent base address indicated by the at least one persistent base address register from the address to generate a second offset into the persistent range, wherein the appending comprises appending the unique identifier value to the second offset to generate the modified address.

15. The method of claim 9, further comprising performing a tweak operation, by a tweak circuit of the system, on the output address from the address modifying circuit to generate a tweak value that is used by the encryption engine circuit to generate the ciphertext.

16. The method of claim 15, further comprising storing a copy of the tweak value in a tweak buffer of the system and using the copy of the tweak value for a decryption operation for the ciphertext encrypted with the tweak value.

17. A non-transitory machine readable medium that stores program code that when executed by a machine causes the machine to perform a method comprising:
receiving a memory store request for an address in a system;
checking, by an address modifying circuit of the system, if the address is within a persistent range indicated by at least one persistent range register of the system;
appending, by the address modifying circuit of the system, a unique identifier value for a component corresponding to the memory store request for the address to the address to generate a modified address and outputting the modified address as an output address when the address is within the persistent range;
outputting, by the address modifying circuit of the system, the address as the output address when the address is not within the persistent range; and
generating, by an encryption engine circuit of the system, a ciphertext based on the output address.

18. The non-transitory machine readable medium of claim 17, wherein the system is a multiple socket processor system, and the unique identifier value is unique across the multiple socket processor system.

19. The non-transitory machine readable medium of claim 18, wherein the unique identifier value comprises a socket identification value, a memory controller identification value, and a channel identification value.

20. The non-transitory machine readable medium of claim 17, wherein the memory is a non-volatile random-access memory device and the unique identifier value is assigned to the non-volatile random-access memory device at manufacturing time.

21. The non-transitory machine readable medium of claim 17, further comprising removing, by the address modifying circuit, a persistent base address indicated by a persistent base address register from the address to generate an offset into the persistent range, wherein the appending comprises appending the unique identifier value to the offset to generate the modified address.

22. The non-transitory machine readable medium of claim 17, further comprising:
when the address is within a first persistent range of memory indicated by at least one first persistent range register, removing a first persistent base address indicated by at least one persistent base address register from the address to generate a first offset into the persistent range, wherein the appending comprises appending the unique identifier value to the first offset to generate the modified address, and
when the address is within a second persistent range of memory indicated by at least one second persistent range register, removing a second, different persistent base address indicated by the at least one persistent base address register from the address to generate a second offset into the persistent range, wherein the appending comprises appending the unique identifier value to the second offset to generate the modified address.

23. The non-transitory machine readable medium of claim 17, further comprising performing a tweak operation, by a tweak circuit of the system, on the output address from the address modifying circuit to generate a tweak value that is used by the encryption engine circuit to generate the ciphertext.

24. The non-transitory machine readable medium of claim 23, further comprising storing a copy of the tweak value in a tweak buffer of the system and using the copy of the tweak value for a decryption operation for the ciphertext encrypted with the tweak value.

\* \* \* \* \*